(12) United States Patent
Nakajima

(10) Patent No.: US 8,416,467 B2
(45) Date of Patent: Apr. 9, 2013

(54) FIXTURE STRUCTURE, OPTICAL DEVICE, IMAGE READING DEVICE AND IMAGE FORMING DEVICE

(75) Inventor: Mitsuru Nakajima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1056 days.

(21) Appl. No.: 11/776,159

(22) Filed: Jul. 11, 2007

(65) Prior Publication Data

US 2007/0253731 A1 Nov. 1, 2007

Related U.S. Application Data

(63) Continuation-in-part of application No. 11/553,263, filed on Oct. 26, 2006.

(30) Foreign Application Priority Data

Nov. 7, 2005 (JP) ................................. 2005-322932
Nov. 6, 2006 (JP) ................................. 2006-300942

(51) Int. Cl.
  *H04N 1/04* (2006.01)
  *G02B 7/02* (2006.01)
  *G03B 3/00* (2006.01)

(52) U.S. Cl. ........ 358/474; 359/811; 359/813; 353/100; 353/101

(58) Field of Classification Search ............ 359/811
  See application file for complete search history.

(56) References Cited

U.S. PATENT DOCUMENTS

| | | | |
|---|---|---|---|
| 6,226,055 B1 * | 5/2001 | Koba ................................. 349/5 |
| 6,693,348 B2 | 2/2004 | Nakajima | |
| 6,762,492 B2 | 7/2004 | Nakajima et al. | |
| 6,870,275 B2 | 3/2005 | Nakajima | |
| 8,199,369 B2 * | 6/2012 | Nakajima ...................... 358/474 |
| 2001/0040728 A1 | 11/2001 | Funatsu | |
| 2002/0114086 A1 * | 8/2002 | Morii et al. .................... 359/811 |
| 2005/0007637 A1 * | 1/2005 | Tsai ............................... 358/474 |
| 2005/0105063 A1 * | 5/2005 | Kitabayashi .................. 353/119 |

FOREIGN PATENT DOCUMENTS

| | | | |
|---|---|---|---|
| CN | 1372411 A | | 10/2002 |
| JP | 53-55527 | * | 10/1976 |
| JP | 56-75713 | | 11/1979 |

(Continued)

OTHER PUBLICATIONS

Masahiko, English machine translation of patent JP2003241052A from JPO, Aug. 27, 2003.*

(Continued)

*Primary Examiner* — David K Moore
*Assistant Examiner* — Peter L Cheng
(74) *Attorney, Agent, or Firm* — Oblon, Spivak, McClelland, Maier & Neustadt, L.L.P.

(57) ABSTRACT

A fixture structure is disclosed that is able to independently adjust relative positions of constituent components in different directions and able to reduce workload of the relative position adjustment. The fixture structure includes plural members fixed with each other by screws, a first adjustment unit for adjusting relative positions of two or more of the members in a first direction and arranged on surfaces of the two or more members parallel to the first direction, and a second adjustment unit for adjusting relative positions of two of more of the members in a second direction intersecting with the first direction and arranged on surfaces of the two or more members parallel to the second direction.

9 Claims, 16 Drawing Sheets

FOREIGN PATENT DOCUMENTS

| | | |
|---|---|---|
| JP | 5-297256 | 11/1993 |
| JP | 06018653 A * | 1/1994 |
| JP | 9-193031 | 7/1997 |
| JP | 2573985 | 3/1998 |
| JP | H11-102015 * | 4/1999 |
| JP | 11-227249 | 8/1999 |
| JP | 2000-193863 | 7/2000 |
| JP | 2001-228382 | 8/2001 |
| JP | 2001-311878 | 11/2001 |
| JP | 2001-318319 | 11/2001 |
| JP | 2002-311364 | 10/2002 |
| JP | 2003-241052 | 8/2003 |
| JP | 2003241052 * | 8/2003 |
| JP | 2005-99199 | 4/2005 |

OTHER PUBLICATIONS

Ikeda, English machine translation of patent document JP H11-102015 from JPO, Apr. 13, 1999.*

* cited by examiner

FIXTURE STRUCTURE, OPTICAL DEVICE, IMAGE READING DEVICE AND IMAGE FORMING DEVICE

CROSS-REFERENCE TO RELATED APPLICATION

The present application is a continuation-in-part application of the U.S. patent application Ser. No. 11/553,263 filed on Oct. 26, 2006, based on Japanese Priority Patent Application No. 2006-300942 filed on Nov. 6, 2006. The entire contents of the application are hereby incorporated by reference.

BACKGROUND OF THE INVENTION

1. Field of the Invention

The present invention relates to a fixture structure including a first member and a second member, an optical device having the fixture structure and used in a copier, an image scanner, or a facsimile machine; and to an image reading device, and an image forming device.

2. Description of the Related Art

In the related art, in an optical device such as an image reading device used in a copier, an image scanner, or a facsimile machine, the constituent components of the optical device are fixed by using screws. For example, such optical devices are described in Japanese Laid-Open Patent Application No. 2001-313779 (below, referred to as "reference 1"), Japanese Laid-Open Patent Application No. 2002-311364 (below, referred to as "reference 2"), Japanese Laid-Open Patent Application No. 11-227249 (below, referred to as "reference 3"), Japanese Patent Gazette No. 2794892 (below, referred to as "reference 4"), Japanese Laid-Open Patent Application No. 2000-193863 (below, referred to as "reference 5"), and Japanese Laid-Open Patent Application No. 5-297256 (below, referred to as "reference 6").

In the image reading device, it is required that pixels of a photoelectric conversion element thereof, such as a CCD, be smaller and smaller, and the number of the CCD pixels be more and more. In order to achieve a large number of small CCD pixels, it is necessary to reduce the magnification of a lens for forming a reflection image of the original image on the CCD, and it is necessary to increase position precision between the constituent components of the image reading device.

For example, consider an image reading device for reading a document of A3 size at 600 dpi; if pixel intervals of the CCD are 10 μm, it is required that the magnification of the lens be 0.24; if the pixel intervals of the CCD are 5 μm, it is required that the magnification of the lens be 0.12. On the other hand, since the required position precision of the lens and the CCD in the optical axis direction relates to the square of the pixel intervals, if the pixel intervals are reduced by half, it is required that the position precision be improved by four times.

In other words, when an image reading device has CCD pixel intervals of 5 μm, in order to obtain the same image quality as an image reading device having CCD pixel intervals of 10 μm, it is required that the relative position precision of the constituent components of the image reading device be improved by four times. For example, if the position precision of the constituent components in the image reading device having CCD pixel intervals of 10 μm is 20 μm, the position precision of the constituent components in the image reading device having CCD pixel intervals of 5 μm should be 5 μm.

As described in reference 1, it is known that the position precision of the constituent components attached with screws is from several hundreds μm to several tens μm. Due to this, although a high position precision of the constituent components is required when the CCD pixel intervals are reduced, it is difficult to obtain the required position precision by attaching the constituent components of the optical device with screws.

To meet this requirement, so far one usually slowly fastens the screws while confirming the optical property. Specifically, each time a screw is fastened, the optical property is confirmed; if the optical property does not meet the required level, the screw is unfastened, the relative position precision of the constituent components is adjusted, then the screw is fastened again, and then the optical property is confirmed again. As a result, it takes a long time to attach the components; hence, assembling the image reading device is quite time-consuming, and productivity of manufacturing the image reading device is low.

In addition, while the screws are being fastened, positions of the constituent components of the optical device may shift. When adjusting the positions of two components and fastening the screws, usually, one component is fixed, and the other component is fastened with positioning means, such as a chuck. Then, the relative position of the two components is adjusted with the positioning means, and the screw is fastened after the position adjustment. Then, the chuck on the other component is unfastened to finish fastening the two components.

In the above process, since the positions of the two components are adjusted while the other component is fixed with the chuck, the other component receives a force from the screw when the screw is fastened on the other component, and a force from the chuck. Thus, when the chuck on the other component is unfastened, the other component only receives a force from the screw when the screw is fastened, and this force may change the position of the other component determined through the position adjustment.

In addition, if the position adjustment of the two components is performed with the screws being unfastened, and the two components are fixed after the screws are fastened, since the two components change from a free state, in which the two components are freely movable relative to each other, to a fixed state, in which the two components are fixed relative to each other, the relative position of the two components changes before and after the screws are fastened. In order to reduce the change of the relative position, it is necessary to adjust the relative position of the two components while the screws are being sufficiently strongly fastened so as to reduce the difference of the fastening power of the screw between the free state, in which the two components are freely movable relative to each other, to the fixed state, in which the two components are fixed relative to each other. However, it is apparent that a strong force is required to move the two components relative to each other when the screw is fastened strongly.

Due to this, in order to easily move the two components relative to each other with the screw being fastened sufficiently strongly, usually, a notch is formed in communication with both of the two components, and a driver or another tool can be inserted into the notch to move the two components for position adjustment.

However, when inserting a tool into the notch, which is formed in both of the components, to adjust the relative position of the two components, sometimes the tool inserted into the notch may touch one of the two components unintentionally. Especially, when the position adjustment of one of the two components has been finished, that is, the movement of the one component is restricted, if the tool touches the other component, the other component may move in an unintended direction. Especially, the other component may move in the direction intersecting the direction in which the relative position of the two components is adjusted with the tool inserted into the notch. In this case, it is necessary to adjust the relative position of the two components in the direction in which the other component moves (that is, the unintended direction); hence, it takes a long time to adjust the relative position of the two components.

To address the problem to be solved by the present invention, in the methods of assembling components of optical devices as disclosed in reference 1 through reference 6, the relative positions of components are adjusted in a first direction and a second direction, which are perpendicular to each other and perpendicular to an optical axis. Therefore, once the relative positions of the components are adjusted in the first direction and the second direction, it is difficult to adjust the relative position of the components in the first direction or the second direction, independently. Due to this, in the related art, for example, even when it is sufficient to merely adjust the relative position of the components in the first direction, when position adjustment is performed, the component relative position in the second direction is inevitably adjusted at the same time; consequently, even in the first direction in which the position adjustment has been completed, the components are moved unintentionally.

SUMMARY OF THE INVENTION

Accordingly, an embodiment of the present invention may solve one or more problems of the related art.

A preferred embodiment of the present invention provides a fixture structure and an optical device able to independently adjust relative positions of constituent components in different directions, to reduce the workload of adjusting the relative positions of the constituent components, and to provide an image reading device and an image forming device using the optical device.

According to a first aspect of the present invention, there is provided a fixture structure, comprising:
 a plurality of members fixed to each other by screws;
 a first adjustment unit that is able to adjust relative positions of two or more of the members in a first direction, and is arranged on surfaces of the two or more members parallel to the first direction; and
 a second adjustment unit that is able to adjust relative positions of two of more of the members in a second direction intersecting the first direction, and is arranged on surfaces of the two or more members parallel to the second direction.

In an embodiment, the plurality of members comprises:
 a first member;
 a second member fixed to the first member by a screw; and
 a third member fixed to the second member by a screw;
wherein
 the first adjustment unit is arranged on a first surface of the first member and a second surface of the second member, said first surface and said second surface being parallel to the first direction; and
 the second adjustment unit is arranged on a third surface of the second member and a fourth surface of the third member, said third surface and said fourth surface being parallel to the second direction.

In an embodiment, the fixture structure further comprises:
 a first screw-fixing unit that is arranged on the first surface of the first member and the second surface of the second member parallel to the first direction, and fixes the first member and the second member by a screw;
 a second screw-fixing unit that is arranged on the third surface of the second member and the fourth surface of the third member parallel to the second direction, and fixes the second member and the third member by a screw; and
 a third screw-fixing unit that fixes the first member and a base member by a screw with a relative position of the first member and the base member changeable in a third direction intersecting both the first direction and the second direction, the first member being disposed on the base member.

According to a second aspect of the present invention, there is provided an optical device, comprising:
 a first optical component that includes a lens for passing through light reflected from a manuscript;
 a second optical component that includes a photoelectric conversion unit for forming a reflection image from the reflected light; and
 a fixture structure;
wherein
 the fixture structure includes
 a first member attached to the first optical component;
 a second member fixed to the first member by a screw;
 a third member fixed to the second member by a screw and attached to the second optical component;
 a first adjustment unit that is able to adjust a relative position of the first member and the second member in a first direction, and is arranged on a first surface of the first member and a second surface of the second member, said first surface and said second surface being parallel to the first direction; and
 a second adjustment unit that is able to adjust a relative position of the second member and the third member in a second direction intersecting the first direction, and is arranged on a third surface of the second member and a fourth surface of the third member, said third surface and said fourth surface being parallel to the second direction.

In an embodiment, the fixture structure further comprises:
 a first screw-fixing unit that is arranged on the first surface of the first member and the second surface of the second member parallel to the first direction, and fixes the first member and the second member by a screw;
 a second screw-fixing unit that is arranged on the third surface of the second member and the fourth surface of the third member parallel to the second direction, and fixes the second member and the third member by a screw; and
 a third screw-fixing unit that fixes the first member and a base member by a screw with a relative position of the first member and the base member changeable in a third direction intersecting both the first direction and the second direction, the first member being disposed on the base member.

In an embodiment, the first adjustment unit and the second adjustment unit are located at positions symmetric with respect to an optical axis of the lens.

In an embodiment, there are a plurality of the first screw-fixing units, the second screw-fixing units, and the third screw-fixing units, and the first screw-fixing units, the second screw-fixing units, and the third screw-fixing units are respectively located at positions symmetric with respect to an optical axis of the lens.

In an embodiment, each of the first screw-fixing unit, the second screw-fixing unit, and the third screw-fixing unit includes:
 a screw part that is screwed into one of the first member, the second member, and the third member; and
 an urging unit that is disposed between a head of the screw part and the one of the first member, the second member, and the third member, and urges the head of the screw part to move away from the one of the first member, the second member, and the third member.

According to a third aspect of the present invention, there is provided a method of assembling an optical device including a first optical component that has a lens for passing through light reflected from a manuscript; a second optical component that has a photoelectric conversion unit for forming a reflection image from the reflected light; and a fixture structure, wherein the fixture structure includes a first member attached to the first optical component; a second member fixed to the first member by a screw; a third member fixed to the second member by a screw and attached to the second optical component; a first adjustment unit that is able to adjust a relative position of the first member and the second member in a first direction, and is arranged on a first surface of the first member and a second surface of the second member, said first surface and said second surface being parallel to the first direction; a second adjustment unit that is able to adjust a relative position of the second member and the third member in a second direction intersecting the first direction, and is arranged on a third surface of the second member and a fourth surface of the third member, said third surface and said fourth surface being parallel to the second direction; a first screw-fixing unit that is arranged on the first surface of the first member and the second surface of the second member parallel to the first direction, and fixes the first member and the second member by a screw; a second screw-fixing unit that is arranged on the third surface of the second member and the fourth surface of the third member parallel to the second direction, and fixes the second member and the third member by a screw; and a third screw-fixing unit that fixes the first member and a base member by a screw with a relative position of the first member and the base member changeable in a third direction intersecting both the first direction and the second direction, the first member being disposed on the base member;

said method comprising the steps of:

fixing the first screw-fixing unit, the second screw-fixing unit, and the third screw-fixing unit;

partially loosening one of the first screw-fixing unit, the second screw-fixing unit and the third screw-fixing unit corresponding to one of the first direction, the second direction, and the third direction in which relative position adjustment is required;

adjusting relative positions in the one of the first direction, the second direction, and the third direction between the base member, the first member, the second member, and the third member;

fixing the adjusted one of the first screw-fixing unit, the second screw-fixing unit, and the third screw-fixing unit after; and adjusting relative positions between the base member, the first member, the second member, and the third member in the other ones of the first direction, the second direction, and the third direction.

According to a fourth aspect of the present invention, there is provided a method of assembling an optical device including a first optical component that has a lens for passing through light reflected from a manuscript; a second optical component that has a photoelectric conversion unit for forming a reflection image from the reflected light; and a fixture structure, wherein the fixture structure includes a first member attached to the first optical component; a second member fixed to the first member by a screw; a third member fixed to the second member by a screw and attached to the second optical component; a first adjustment unit that is able to adjust a relative position of the first member and the second member in a first direction, and is arranged on a first surface of the first member and a second surface of the second member, said first surface and said second surface being parallel to the first direction; a second adjustment unit that is able to adjust a relative position of the second member and the third member in a second direction intersecting the first direction, and is arranged on a third surface of the second member and a fourth surface of the third member, said third surface and said fourth surface being parallel to the second direction; a first screw-fixing unit that is arranged on the first surface of the first member and the second surface of the second member parallel to the first direction, and fixes the first member and the second member by a screw; a second screw-fixing unit that is arranged on the third surface of the second member and the fourth surface of the third member parallel to the second direction, and fixes the second member and the third member by a screw; and a third screw-fixing unit that fixes the first member and a base member by a screw with a relative position of the first member and the base member changeable in a third direction intersecting both the first direction and the second direction, the first member being disposed on the base member, said method comprising the steps of:

adjusting a relative position between the first member, and fixing the first member and the base member with the third screw-fixing unit;

adjusting a relative position between the first member and the second member, and fixing the first member and the second member with the first screw-fixing unit; and adjusting a relative position between the second member and the third member, and fixing the second member and the third member with the second screw-fixing unit.

According to a fifth aspect of the present invention, there is provided a method of assembling an optical device including a first optical component that has a lens for passing through light reflected from a manuscript; a second optical component that has a photoelectric conversion unit for forming a reflection image from the reflected light; and a fixture structure, wherein the fixture structure includes a first member attached to the first optical component; a second member fixed to the first member by a screw; a third member fixed to the second member by a screw and attached to the second optical component; a first adjustment unit that is able to adjust a relative position of the first member and the second member in a first direction, and is arranged on a first surface of the first member and a second surface of the second member, said first surface and said second surface being parallel to the first direction; a second adjustment unit that is able to adjust a relative position of the second member and the third member in a second direction intersecting the first direction, and is arranged on a third surface of the second member and a fourth surface of the third member, said third surface and said fourth surface being parallel to the second direction; a first screw-fixing unit that is arranged on the first surface of the first member and the second surface of the second member parallel to the first direction, and fixes the first member and the second member by a screw; a second screw-fixing unit that is arranged on the third surface of the second member and the fourth surface of the third member parallel to the second direction, and fixes the second member and the third member by a screw; and a third screw-fixing unit that fixes the first member and a base member by a screw with a relative position of the first member and the base member changeable in a third direction intersecting both the first direction and the second direction, the first member being disposed on the base member, said method comprising the steps of:

tentatively fixing the first screw-fixing unit, the second screw-fixing unit, and the third screw-fixing unit;

adjusting relative positions between the base member, the first member, the second member, and the third member in a predetermined one of the first direction, the second direction, and the third direction;

fixing one of the first screw-fixing unit, the second screw-fixing unit, and the third screw-fixing unit corresponding to the predetermined direction; and adjusting relative positions between the base member, the first member, the second member, and the third member in the other ones of the first direction, the second direction, and the third direction.

According to a sixth aspect of the present invention, there is provided a method of assembling an optical device including a first optical component that has a lens for passing through light reflected from a manuscript; a second optical component that has a photoelectric conversion unit for forming a reflection image from the reflected light; and a fixture structure, wherein the fixture structure includes a first member attached to the first optical component; a second member fixed to the first member by a screw; a third member fixed to the second member by a screw and attached to the second optical component; a first adjustment unit that is able to adjust a relative position of the first member and the second member in a first direction, and is arranged on a first surface of the first member and a second surface of the second member, said first surface and said second surface being parallel to the first direction; a second adjustment unit that is able to adjust a relative position of the second member and the third member in a second direction intersecting the first direction, and is arranged on a third surface of the second member and a fourth surface of the third member, said third surface and said fourth surface being parallel to the second direction; a first screw-fixing unit that is arranged on the first surface of the first member and the second surface of the second member parallel to the first direction, and fixes the first member and the second member by a screw; a second screw-fixing unit that is arranged on the third surface of the second member and the fourth surface of the third member parallel to the second direction, and fixes the second member and the third member by a screw; and a third screw-fixing unit that fixes the first member and a base member by a screw with a relative position of the first member and the base member changeable in a third direction intersecting both the first direction and the second direction, the first member being disposed on the base member;

said method comprising the steps of:

fixing or tentatively fixing the base member, the first member, the second member, and the third member; and when adjusting relative positions between the base member, the first member, the second member, and the third member, adjusting the relative positions between the first member, the second member, and the third member in ascending order of distances of the first member, the second member, and the third member to the base member.

According to a seventh aspect of the present invention, there is provided an image reading device able to read an image on a manuscript from light reflected from the manuscript by a photoelectric conversion unit, comprising:

an optical device that includes a first optical component that includes a lens for passing through light reflected from a manuscript;

a second optical component that includes the photoelectric conversion unit for forming a reflection image from the reflected light; and a fixture structure;

wherein the fixture structure includes a first member attached to the first optical component;

a second member fixed to the first member by a screw;

a third member fixed to the second member by a screw and attached to the second optical component;

a first adjustment unit that is able to adjust a relative position of the first member and the second member in a first direction, and is arranged on a first surface of the first member and a second surface of the second member, said first surface and said second surface being parallel to the first direction; and a second adjustment unit that is able to adjust a relative position of the second member and the third member in a second direction intersecting the first direction, and is arranged on a third surface of the second member and a fourth surface of the third member, said third surface and said fourth surface being parallel to the second direction.

According to an eighth aspect of the present invention, there is provided an image forming device, comprising:

an image reading device configured to read an image on a manuscript from light reflected from the manuscript by a photoelectric conversion unit;

wherein the image reading device has an optical device that includes a first optical component that has a lens for passing through light reflected from a manuscript; a second optical component that has the photoelectric conversion unit for forming a reflection image from the reflected light; and a fixture structure, wherein the fixture structure includes a first member attached to the first optical component;

a second member fixed to the first member by a screw; and a third member fixed to the second member by a screw and attached to the second optical component;

a first adjustment unit that is able to adjust a relative position of the first member and the second member in a first direction, and is arranged on a first surface of the first member and a second surface of the second member, said first surface and said second surface being parallel to the first direction; and a second adjustment unit that is able to adjust a relative position of the second member and the third member in a second direction intersecting the first direction, and is arranged on a third surface of the second member and a fourth surface of the third member, said third surface and said fourth surface being parallel to the second direction.

According to the fixture structure of the present invention, since the first adjustment unit is arranged on surfaces of the members parallel to the first direction, when the first adjustment unit is used, the relevant members only move relatively in the first direction, but do not move relatively in the second direction; on the other hand, since the second adjustment unit is arranged on surfaces of the members parallel to the second direction, when the second adjustment unit is used, the relevant members only move relatively in the second direction, but do not move relatively in the first direction.

Therefore, when adjusting a relative position of components in the first direction, only the first adjustment unit is used, and it is not necessary to use the second adjustment unit; when adjusting a relative position of components in the second direction, only the second adjustment unit is used, and it is not necessary to use the first adjustment unit. Namely, position adjustment in the first direction is independent from that in the second direction, and this makes the position adjustment easy; moreover, even when it is required to re-adjust the relative position of the components, the time required for this re-adjustment can be reduced. Consequently, when adjusting the relative position of components, it is possible to perform the position adjustment independently in different directions, and it is possible to reduce the workload of adjusting the relative positions of the components.

In addition, since there are a first member, a second member fixed to the first member by a screw, and a third member fixed with the second member by a screw, and the first adjustment unit is arranged on surfaces of the first member and the second member parallel to the first direction, and the second adjustment unit is arranged on surfaces of the second member and the third member parallel to the second direction, when making adjustment in the first direction, only the first adjustment unit is used to adjust the relative position between the first member and the second member, and when making adjustment in the second direction, only the second adjustment unit is used to adjust the relative position between the second member and the third member. Due to this, in the relative position adjustment, only the relative position between the relevant members in one direction is adjusted; the relevant members do not move relatively in plural directions. Consequently, it is possible to reduce the workload of position adjustment, and reduce the workload of assembling an optical device.

Further, since the fixture structure further comprises a first screw-fixing unit for fixing the first member and the second member in the first direction, and a second screw-fixing unit for fixing the second member and the third member in the second direction, after the first position adjustment mechanism adjusts the relative position between the first member and the second member, the first screw-fixing unit can then fix the first member and the second member; and after the second position adjustment mechanism adjusts the relative position between the second member and the third member, the second screw-fixing unit can then fix the second member and the third member.

Therefore, when the first adjustment unit is used to adjust the relative position between the first member and the second member, only the first screw-fixing unit is used to fix the first member and the second member; and when using the second adjustment unit to adjust the relative position between the second member and the third member, only the second screw-fixing unit is used to fix the second member and the third member. Therefore, the first member and the second member can be fixed with position adjustment in the first direction independent from that in the second direction, and this makes the position adjustment between components easy; moreover, even when it is required to re-adjust the relative position of the components, the time required for the re-adjustment can be reduced. Consequently, when adjusting the relative position of components, it is possible to perform the position adjustment and fix the components independently in different directions, and it is possible to reduce the workload of adjusting the relative position of the components.

According to the optical device of the present invention, it is possible to reduce the workload of adjusting the relative position of the optical elements especially when high relative position precision is required for the optical elements, such as a lens or a photoelectric conversion unit.

In addition, since plural first adjustment units are located at positions symmetric with respect to an optical axis of the lens, when using the first adjustment unit to adjust the relative position between the first member and the second member, the movement distances of the first member and the second member are symmetric with respect to the optical axis of the lens.

Since plural second adjustment units are located at positions symmetric with respect to the optical axis of the lens, when using the second adjustment unit to adjust the relative position between the second member and the third member, the movement distances of the second member and the third member are symmetric with respect to the optical axis of the lens. Therefore, adjustment of the relative positions of components becomes easy, and it is possible to reduce the workload of adjusting relative positions of components.

In addition, since the first screw-fixing unit is located at a position symmetric with respect to the optical axis of the lens, when fixing the first member and the second member in the first direction, the relative position deviation of the first member and the second member, which deviation occurs when the screws are fastened, is symmetric with respect to the optical axis of the lens.

Since the second screw-fixing unit is located at positions symmetric with respect to the optical axis of the lens, when fixing the second member and the third member in the second direction, the relative position deviation of the second member and the third member, which deviation occurs when the screws are fastened, is symmetric with respect to the optical axis of the lens.

Since the third screw-fixing unit is located at positions symmetric with respect to the optical axis of the lens, when fixing the first member and the base member in the third direction, the relative position deviation of the first member and the base member, which deviation occurs when the screws are fastened, are symmetric with respect to the optical axis of the lens.

Therefore, it is possible to easily predict the relative position deviation of the first member and the base member when the screws are fastened, and it is possible to reduce the time for adjusting the relative position of the first member and the base member.

In addition, since the first screw-fixing unit, the second screw-fixing unit, and the third screw-fixing unit have an urging unit for urging a head of a screw part to move away from the first member, the second member, and the third member, it is possible to stabilize the torque for fastening screws when the first screw-fixing unit, the second screw-fixing unit, and the third screw-fixing unit tentatively fix the first member, the second member, and the third member, and it is possible to prevent relative position deviation of components when fastening screws to fully fix the components. Therefore, it is possible to reduce the number of times of making the relative position adjustment of components, and to reduce the time for adjusting relative position of the components.

According to the method of assembling an optical device of the present invention, first, all of the first screw-fixing unit, the second screw-fixing unit, and the third screw-fixing unit are fixed; then, one of the first screw-fixing unit, the second screw-fixing unit and the third screw-fixing unit is loosened, which corresponds to a direction in which relative position adjustment is required, and relative positions in the direction are adjusted. Therefore, during position adjustment, it is possible to prevent relative position deviation of components in directions other than the direction in which the adjustment is being made, and it is possible to prevent the relative position deviation of the components when fastening screws after adjustment. Consequently, it is possible to reduce the number of times of making the relative position adjustment of components, and to reduce the time for assembling the optical device.

In addition, since the members are adjusted and fixed in ascending order of distances to the base member, after the members are adjusted it is not necessary to re-adjust them;

this reduces the number of times of position adjustment and the time for assembling the optical device.

In addition, all of the first screw-fixing unit, the second screw-fixing unit, and the third screw-fixing unit are tentatively fixed first for relative position adjustment of the base member, the first member, the second member, and the third member in the first direction, the second direction, and the third direction, respectively, and then the first screw-fixing unit, the second screw-fixing unit are fully fixed. Once the members are fully fixed it is not necessary to loosen any of the fixed screw-fixing units; this reduces the number of times of position adjustment and the time for assembling the optical device.

In addition, since the first member, the second member, and the third member are adjusted in ascending order of their distances to the base member, it is possible to prevent relative position deviation of the components close to the base member, and prevent unintended position deviation of the components under adjustment. Furthermore, it is not necessary to make re-adjustment, and this reduces the time for making adjustment.

According to the image reading device of the present invention, it is possible to prevent movement of components in an unintended direction when adjusting the relative position of the components, and this reduces the workload of adjusting the relative position of the members.

According to the image forming device of the present invention, it is possible to prevent movement of components in an unintended direction when adjusting the relative position of the components, and this reduces the workload of adjusting the relative position of the members.

These and other objects, features, and advantages of the present invention will become more apparent from the following detailed description of preferred embodiments given with reference to the accompanying drawings.

DESCRIPTION OF THE PREFERRED EMBODIMENTS

Below, preferred embodiments of the present invention are explained with reference to the accompanying drawings.

Figure 1:
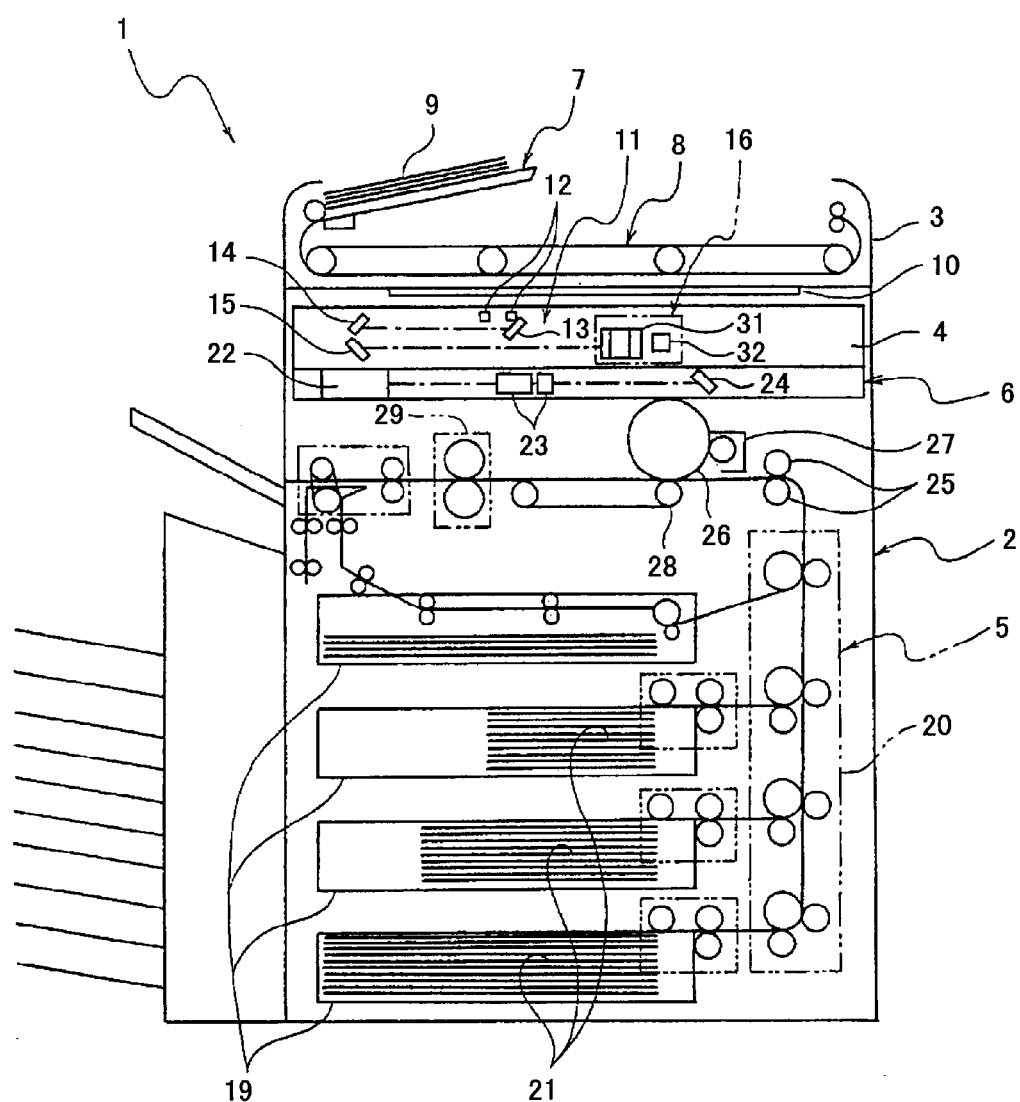
FIG. 1 is schematic view illustrating a structure of an image forming device according to an embodiment of the present invention.

FIG. 1 is schematic view illustrating a structure of an image forming device according to an embodiment of the present invention.

An image forming device 1 shown in FIG. 1 may be a copier or a facsimile machine and others. As shown in FIG. 1, the image forming device 1 includes a main body 2, an ADF (Automatic Document Feeder) 3, a scanner 4, a paper feeder 5, and a writing unit 6.

The main body 2, for example, has a box shape, and is installed on a floor. The main body 2 accommodates the scanner 4, the paper feeder 5, and the writing unit 6.

The ADF 3 is mounted on the main body 2. The ADF 3 includes a document loading unit 7, and a belt feeding unit 8. The document loading unit 7 is a plate; it is mounted on the main body 2, and plural pieces of documents 9 are placed on the surface of the document loading unit 7.

The belt feeding unit 8 feeds out the documents 9 on the surface of the document loading unit 7 to a contact glass 10 (described below) one by one, and delivers the documents 9 from the contact glass 10 out of the main body 2 after reflection images of the documents 9 are read by an image reading device 16 (described below).

The scanner 4 is mounted on the main body 2 but below the ADF 3; it includes the contact glass 10 for locating the documents 9, and an optical scanning system 11. The contact glass 10 is mounted on the main body 2 so that the upper surface and the lower surface of the contact glass 10 are parallel to the horizontal direction.

The optical scanning system 11 includes an exposure lamp 12, a first mirror 13, a second mirror 14, a third mirror 15, and the image reading device 16. The optical scanning system 11 irradiates light on the documents 9, and the light reflected from the documents 9 is received by a line-type photoelectric conversion element 42 (described below) and is converted into electrical signals.

The exposure lamp 12 irradiates light on the documents 9 on the contact glass 10. The first mirror 13, the second mirror 14, and the third mirror 15 direct the light reflected from the documents 9 to the image reading device 16.

The exposure lamp 12 and the first mirror 13 are attached to a first carriage (not illustrated), and the second mirror 14 and the third mirror 15 are attached to a second carriage (not illustrated). When reading a document, the first carriage and the second carriage are mechanically moved at a relative speed of 2:1 so that the lengths of the light paths are the same.

The first carriage and the second carriage of the optical scanning system 11 are moved by a scanner driving motor (not-illustrated).

The image reading device 16 includes an image-forming lens system 31, an image sensor 32, and others. Details of the structure of the image reading device 16 are explained below.

In the image reading device 16, the light reflected from the documents 9 is received by the image sensor 32, and the received light is converted into electrical signals. The thus obtained electrical signals are output to an image processor (not-illustrated). When the image-forming lens system 31 and the image sensor 32 are moved in the left-right direction in FIG. 1 (that is, the horizontal direction), the image magnification is changed. The positions of the image-forming lens system 31 and the image sensor 32 are adjusted according to the specified magnification.

The paper feeder 5 includes a paper holder 19 and a paper delivery unit 20, both of which are arranged below the main body 2. The paper holder 19 holds plural pieces of paper 21. The paper delivery unit 20 delivers the paper 21 to the space between the resist rollers 25 (described below). The paper feeder 5 delivers the paper 21 in the paper holder 19 to the space between the resist rollers 25, that is, to the writing unit 6.

The writing unit 6 includes a laser output unit 22, an image-forming lens 23, a mirror 24, the resist rollers 25, a photoconductive drum 26, a developing unit 27, a transfer member 28, and a fusing member 29.

The laser output unit 22 includes laser diodes acting as light sources, and a polygon mirror rotating at a high and constant speed. A laser beam from the laser output unit 22 is deflected by the rotating polygon mirror, passes through the image-forming lens 23, is reflected by the mirror 24, and is condensed on the outer surface of the photoconductive drum 26 to form an image. The deflected laser beam scans and exposes the outer surface of the photoconductive drum 26 in a main scan direction, which is the direction perpendicular to the rotating direction of the photoconductive drum 26, to record the image in units of lines according to the image signals output from the image processor. The writing unit 6 repeats the main scan in a specified period determined by the rotating speed and the recording density of the photoconductive drum 26, and forms an electrostatic latent image on the outer surface of the photoconductive drum 26.

A laser beam sensor (not-illustrated) is arranged at the laser irradiation position near one end of the photoconductive drum 26, and when the laser beam from the writing unit 6 is emitted onto the photoconductive drum 26, the laser beam sensor produces a main scan synchronization signal. Based on the main scan synchronization signal from the laser beam sensor, control of image recording timing is performed, and control signals are generated for input and output of image signals (described below).

The resist rollers 25 convey the paper 21, which is delivered from paper holder 19 by the paper delivery unit 20, to the space between the photoconductive drum 26 and the transfer member 28. The photoconductive drum 26 is column-shaped or is tube-like and is rotatable about the axial center thereof. On the photoconductive drum 26 toner is applied on the electrostatic latent image formed by the laser beam from the laser output unit 22 to develop the latent image, and the thus obtained toner image is transferred onto the paper 21 located between the photoconductive drum 26 and the transfer member 28.

The developing unit 27 attaches toner to the outer surface of the photoconductive drum 26 to develop the latent image on the outer surface of the photoconductive drum 26.

The transfer member 28 presses the paper 21 against the outer surface of the photoconductive drum 26 to transfer the toner from the outer surface of the photoconductive drum 26 onto the paper 21, and then conveys the paper 21 to the fusing member 29.

The fusing member 29 fuses the toner image transferred from the photoconductive drum 26 onto the paper 21, and delivers the paper 21 out of the main body 2.

Figure 2:
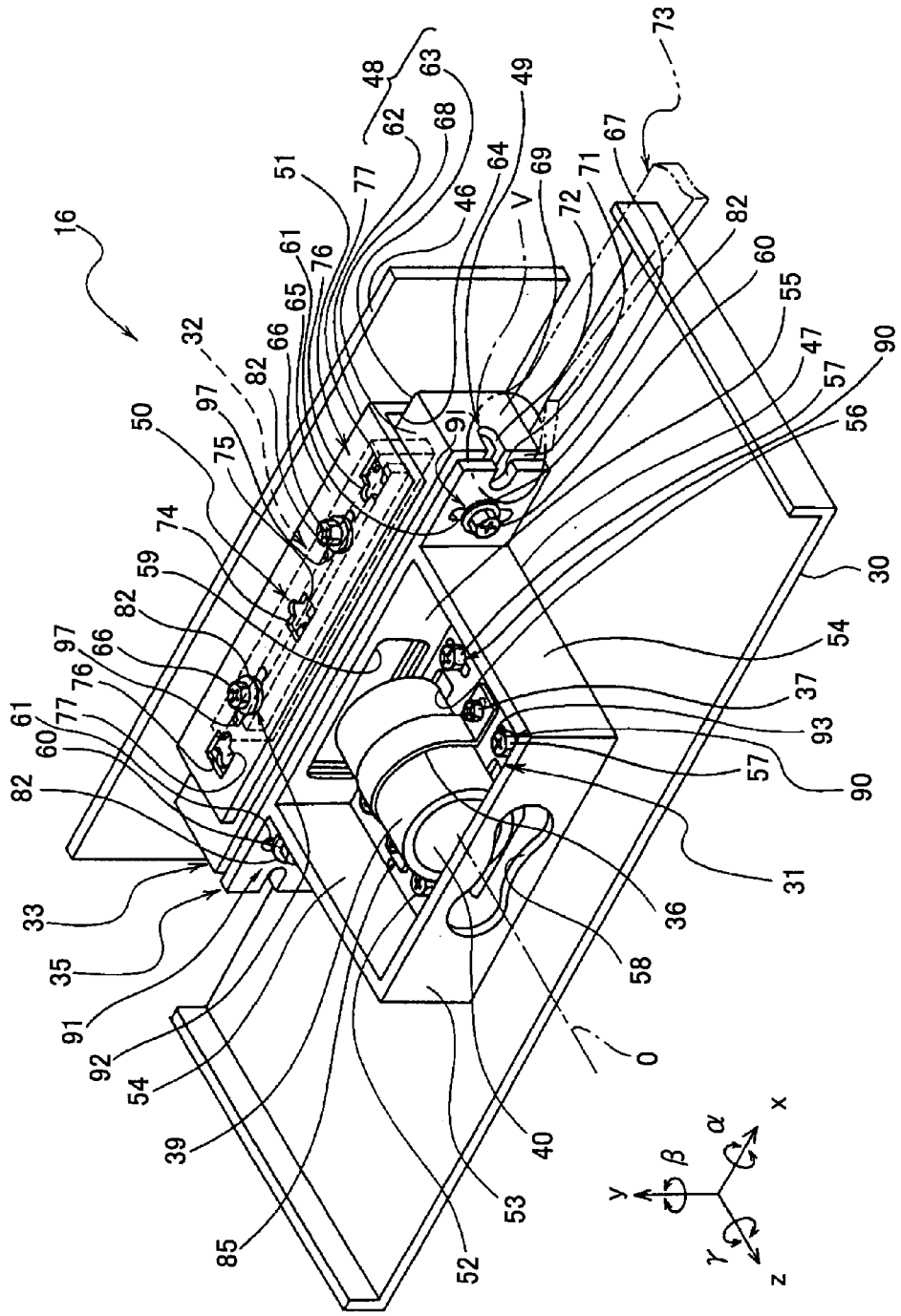
FIG. 2 is a perspective view illustrating the image reading device 16 shown in FIG. 1.

FIG. 2 is a perspective view illustrating the image reading device 16 shown in FIG. 1.

Figure 3:
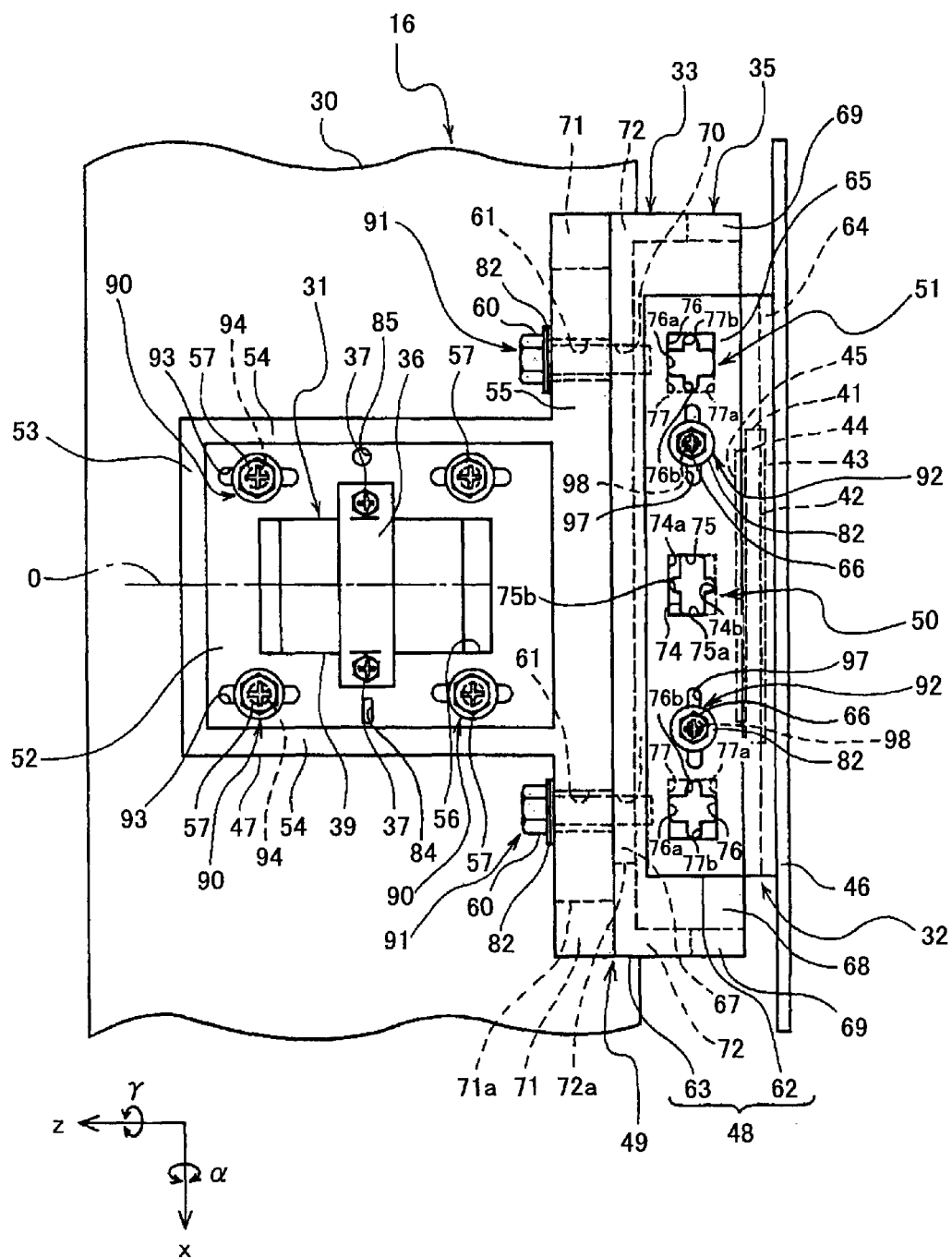
FIG. 3 is a plan view of the image reading device 16 shown in FIG. 2.

FIG. 3 is a plan view of the image reading device 16 shown in FIG. 2.

Figure 4:
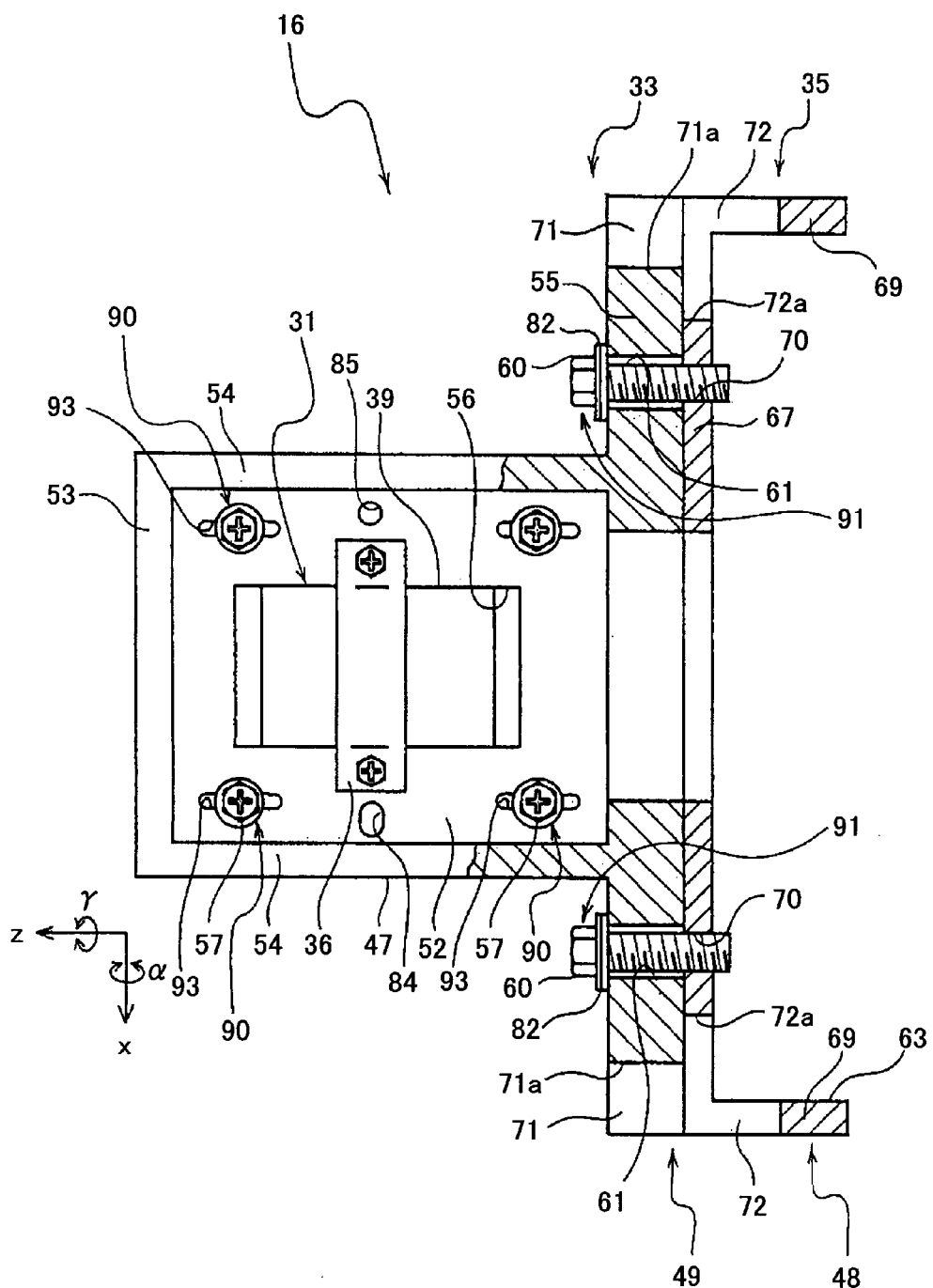
FIG. 4 is a plan view of a core portion of the image reading device 16 shown in FIG. 3.

FIG. 4 is a plan view of a core portion of the image reading device 16 shown in FIG. 3.

As shown in FIG. 2 and FIG. 3, the image reading device 16 includes a base member 30 and a lens block 33, which correspond to the optical device of the present invention.

The base member 30 is formed from a thick metal sheet to be a flat plate. The base member 30 is held in the scanner 4 so that the upper surface and the lower surface thereof are parallel to the horizontal direction. The base member 30 is arranged inside the scanner 4 and is movable in the left-right direction in FIG. 1. A through-hole is formed at the center of the base member 30 to penetrate the base member 30. The cross-sectional shape of the through-hole is rectangular.

The lens block 33 includes the image-forming lens system 31, the image sensor 32, and a fixture structure 35. Below, it is assumed that the direction parallel to the optical axis O (indicated by a dot-dashed line) is referred to as "depth direction Z" (or "Z-axis direction") in FIG. 2, the direction perpendicular to the optical axis O and parallel to the surface of the base member 30 is referred to as "width direction X" (or "X-axis direction") in FIG. 2, and the direction perpendicular to both the optical axis O and the surface of the base member 30 is referred to as "thickness direction Y" (or "Y-axis direction") in FIG. 2. Further, the rotating direction with respect to the depth direction Z is indicated as "γ direction", the rotating direction with respect to the width direction X is indicated as "α direction", and the rotating direction with respect to the thickness direction Y is indicated as "β direction".

Here, the thickness direction Y corresponds to the first direction in claims of the present application, the width direction X corresponds to the second direction in claims of the present application, and the depth direction Z corresponds to the third direction in claims of the present application.

The image-forming lens system 31 includes a lens tube 39, plural lenses 40 held in the lens tube 39, and a fixing member 36 for fixing the lens tube 39. Here, the lenses 40 correspond to the first optical component in claims of the present application.

As shown in FIG. 2, the lens tube 39 is a cylindrical tube, and optical axes of the lenses 40 coincide with each other on the same line. Namely, the lenses 40 are arranged to have the same axis. The optical axis of the lenses 40 coincides with the optical axis of the lens tube 39. Namely, the lenses 40 and the lens tube 39 have the same axis.

The fixing member 36 is formed from a metal sheet, and is belt-like. The center portion of the fixing member 36 follows the outer surface of the lens tube 39, and the two ends of the fixing member 36 are fixed, by screws 37, on a loading plate 52 of a cradle 47 of the fixture structure 35. The lens tube 39 is fitted between the loading plate 52 and the fixing member 36; hence, the lens tube 39 is fixed on the fixture structure 35. In addition, the lens tube 39 is in communication with the aforementioned hole in the base member 30 and a hole 56 in the loading plate 52 (as described below).

The image-forming lens system 31, namely, the lenses 40, transmit the light reflected from the document 9, and the transmitted light forms an image (a reflection image of the image on the document 9) on the line-type photoelectric conversion element 42 of the image sensor 32. In other words, the lenses 40 and the line-type photoelectric conversion element 42 are optically connected.

As shown in FIG. 3, the image sensor 32 includes a package 41, and the line-type photoelectric conversion element 42 corresponding to the photoelectric conversion element in claims of the present application.

For example, the package 41 includes a ceramic base 43, a ceramic window frame 44, and a sealing glass 45. The ceramic base 43 is plate-like, and the line-type photoelectric conversion element 42 is formed on the ceramic base 43. The ceramic window frame 44 is superposed on the edges of the base 43, and is fixed on the base 43 with an adhesive agent.

The sealing glass 45 is plate-like; its edge is superposed on the window frame 44, and is fixed on the window frame 44 with an adhesive agent.

The ceramic base 43, the ceramic window frame 44, and the sealing glass 45 of the package 41 cover the line-type photoelectric conversion element 42. The package 41 is mounted on a printing wiring board 46.

The line-type photoelectric conversion element 42, for example, includes photo diodes (PD), which serve as photoelectric conversion elements, and charge coupled devices (CCD), which serve as charge transferring elements, and the PDs and CCDs are arranged along a straight line. The longitudinal direction of the line-type photoelectric conversion element 42 is parallel to the main scan direction. The line-type photoelectric conversion element 42 corresponds to the second optical component in claims of the present application.

The image sensor 32 includes a conductive pattern of the printing wiring board 46, and electrodes or lead lines for electrical connection with the electrodes of the line-type photoelectric conversion element 42. In addition, the image sensor 32 is fixed on the base member 30 by the fixture structure 35 with the sealing glass 45 opposite to the lenses 40 of the image-forming lens system 31.

The fixture structure 35 includes the base member 30, the cradle 47, which corresponds to the first member in claims of the present application, a second member 48, third screw-fixing units 90, first screw-fixing units 91, second screw-fixing units 92, a first position adjustment mechanism 49, which corresponds to the first adjustment unit in claims of the present application, a second position adjustment mechanism 50, which corresponds to the second adjustment unit in claims of the present application, and a third position adjustment mechanism 51, which correspond to the third adjustment unit in claims of the present application.

The base member 30 is formed from a thick metal plate and has a plate-like shape. The base member 30 is accommodated in the scanner 4 with its two surfaces parallel to the horizontal direction. The base member 30 is movable inside the scanner 4 in the horizontal direction as indicated in FIG. 1. There is a hole at the center of the base member 30, and the hole has a rectangular shape.

The cradle 47 is formed from a thick bent metal sheet, and includes the loading plate 52, a standing plate 53, a pair of side plates 54, and a first flat wall 55, which corresponds to the first contacting surface in claims of the present application.

The loading plate 52 is flat-plate-like, and the hole 56 is formed at the center thereof. The hole 56 penetrates the loading plate 52, and the cross-sectional shape of the hole 56 is rectangular. The loading plate 52 is superposed on the base member 30 with the hole 56 superposed on the through-hole of the base member 30. The cradle 47 of the loading plate 52 is fixed on the base member 30 with several screws 57. In addition, the lens tube 39, which holds the lenses 40, is attached to the loading plate 52 by the fixing member 36, which is used to fix the lens tube 39.

The loading plate 52 has an elongated hole 84 and a circular hole 85, which are arranged at positions such that the image-forming lens system 31 is located between the elongated hole 84 and the circular hole 85. The elongated hole 84 and the circular hole 85 penetrate the loading plate 52, the cross-sectional shape of the elongated hole 84 is an ellipse, and the cross-sectional shape of the circular hole 85 is a circle. There is a hole (not illustrated) in the base member 30 to be in communication with the elongated hole 84 and the circular hole 85.

When adjusting positions of the loading plate 52 of the cradle 47 on the base member 30, a positioning pin (not illustrated), which has an outer diameter equaling the length of the minor axis of the elongated hole 84 and equal to the inner diameter of the circular hole 85, is inserted into the elongated hole 84, the circular hole 85, and the not-illustrated hole in the base member 30.

The elongated hole 84, the circular hole 85, and the not-illustrated hole in the base member 30 define the position of the loading plate 52 of the cradle 47 on the base member 30 with the loading plate 52 of the cradle 47 movable in the width direction X. The lower surface of the loading plate 52 corresponds to the attaching surface in claims of the present application.

The standing plate 53 is arranged to stand on the edge of the loading plate 52 close to the third mirror 15. The pair of side plates 54 are parallel to each other, and are arranged to stand on the two edges of the loading plate 52 in the width direction X, in other words, the pair of side plates 54 are parallel to the optical axis O of the lenses 40 of the image-forming lens system 31.

The first flat wall 55 is plate-like, and is arranged to stand on the edge of the loading plate 52 away from the first mirror 13, the second mirror 14, and the third mirror 15. The two surfaces of the first flat wall 55 are in the X-Y plane, which is parallel to both the width direction X and the thickness direction Y. In addition, a slit 58 and a slit 59 are formed in the standing plate 53 and the first flat wall 55, respectively, so that the light reflected from the document 9 passes through to arrive at the image sensor 32.

As shown in FIG. 4, through-holes 61 are formed at two ends of the first flat wall 55 in the width direction X to receive screws 60. The inner diameter of the through-holes 61 is greater than the outer diameter of the screws 60.

The second member 48 includes a bracket 62 and an intermediate part 63. The bracket 62 corresponds to the third member in claims of the present application, and the intermediate part 63 corresponds to the second member in claims of the present application. Similar to the cradle 47, the bracket 62 is also formed from a thick bent metal sheet, and includes a wiring board fixing portion 64, and a flat wall 65. The wiring board fixing portion 64 is frame-like; it is superposed on the printing wiring board 46, and fixed on the printing wiring board 46. In other words, the bracket 62 is fixed on the printing wiring board 46. In addition, the bracket 62 is attached to the package 41 through the printing wiring board 46, and the package 41 is at a position on the inner side of the wiring board fixing portion 64.

The flat wall 65 is a flat plate, and is arranged to stand on the upper end of the wiring board fixing portion 64 in the thickness direction Y to face the first mirror 13, the second mirror 14, and the third mirror 15. The two surfaces of the flat wall 65 are in the X-Z plane, which is parallel to both the width direction X and the depth direction Z. In addition, through-holes (not illustrated) are formed at two ends of the flat wall 65 in the width direction X to receive screws 66. The inner diameter of the through-holes is greater than the outer diameter of the screws 66.

Similar to the cradle 47 and the bracket 62, the intermediate part 63 is also formed from a thick bent metal sheet, and includes at least a second flat wall 67, which corresponds to the second contacting surface in claims of the present application, and a flat wall 68. In FIG. 2, FIG. 3, and FIG. 4, a pair of side walls 69 are illustrated. It should be noted that the side walls 69 are not indispensable in the present invention; however, in order to improve bending strength of the second flat wall 67 and the flat wall 68, it is preferable to provide the pair of side walls 69.

The second flat wall 67 is plate-like, and as shown in FIG. 4, screw holes 70 are formed in the second flat wall 67 for engagement with the screws 60. For example, the second flat wall 67 is superposed with the first flat wall 55, and the screw 60 passes through the through-hole 61 and is screwed into the screw hole 70, thereby, fixing the first flat wall 55. When the second flat wall 67 is superposed with the first flat wall 55, the intermediate part 63 of the second member 48 is fixed with the cradle 47. In this way, the second flat wall 67 is arranged to be in the aforesaid X-Y plane.

The flat wall 68 is plate-like, and is arranged on the upper end of the second flat wall 67 in the thickness direction Y to stand in a direction away from the first mirror 13, the second mirror 14, and the third mirror 15. The two surfaces of the flat wall 68 are in the X-Z plane. In addition, screw holes (not illustrated) are formed at two ends of the flat wall 68 in the width direction X to engage with the screws 66.

The flat wall 68 is superposed with the flat wall 65 of the bracket 62, and the screw 66 passes through a through-hole and is screwed into the screw hole, thereby, fixing the bracket 62. In this way, the intermediate part 63 of the second member 48, the cradle 47 of the image-forming lens system 31, the bracket 62, and the line-type photoelectric conversion element 42 are fixed together.

The side walls 69 are arranged to stand on the two edges of the flat walls 67, 68 in the width direction X, and the two surfaces of the side walls 69 are in the Y-Z plane, which is parallel to both the thickness direction Y and the depth direction Z.

Figure 10:
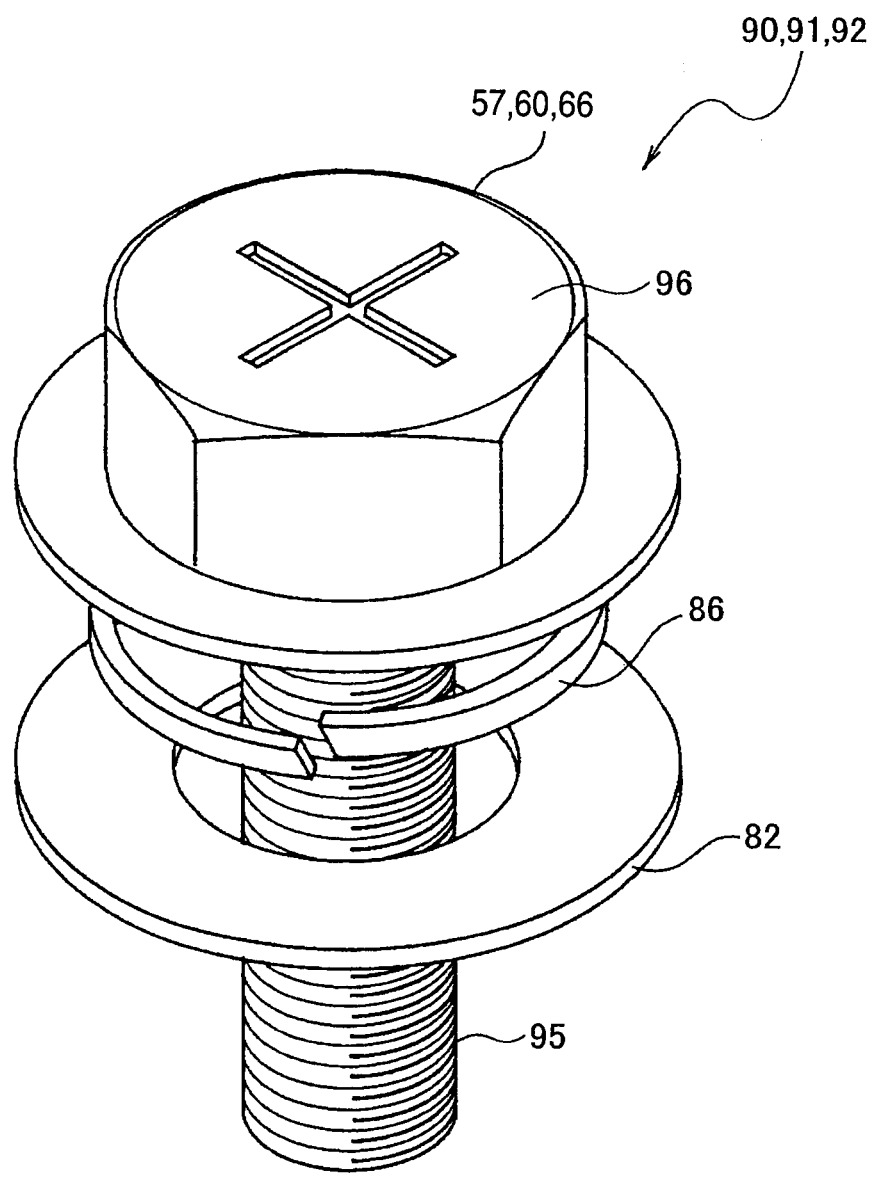
FIG. 10 is perspective view of the screws used in the image reading device 16 shown in FIG. 2.

The third screw-fixing units 90 are for fixing the base member 30 and the cradle 47, and includes plural screw through-holes 93, plural screw holes 94, screws 57, which correspond to the "screw part" in claims of the present application, spring washers 86 (refer to FIG. 10), which correspond to the "urge unit" in claims of the present application, and washers 82 (refer to FIG. 10).

The screw through-holes 93 are formed on the cradle 47 to penetrate the cradle 47. The screw through-holes 93 have a rectangular shape with a longer side thereof parallel to the aforesaid depth direction Z. The screw through-holes 93 are formed at positions for positioning the hole 56, which is formed in the cradle 47 between the screw through-holes 93. The screw through-holes 93 are arranged along the depth direction Z on both sides of the hole 56 at preset intervals. In this example, there are four screw through-holes 93. Namely, there are four third screw-fixing units 90. The screwing (threaded) portions 95 of the screws 57 can pass through the inner side of the screw through-holes 93. In addition, the positions at which the screwing portions 95 of the screws 57 pass through the screw through-holes 93 is variable.

The screw holes 94 are formed in the base member 30, and the screwing portions 95 of the screws 57 are screwed into the screw holes 94. When the cradle 47 is superposed on the base member 30, the screw holes 94 are brought to the same positions as the screw through-holes 93.

Figure 16:
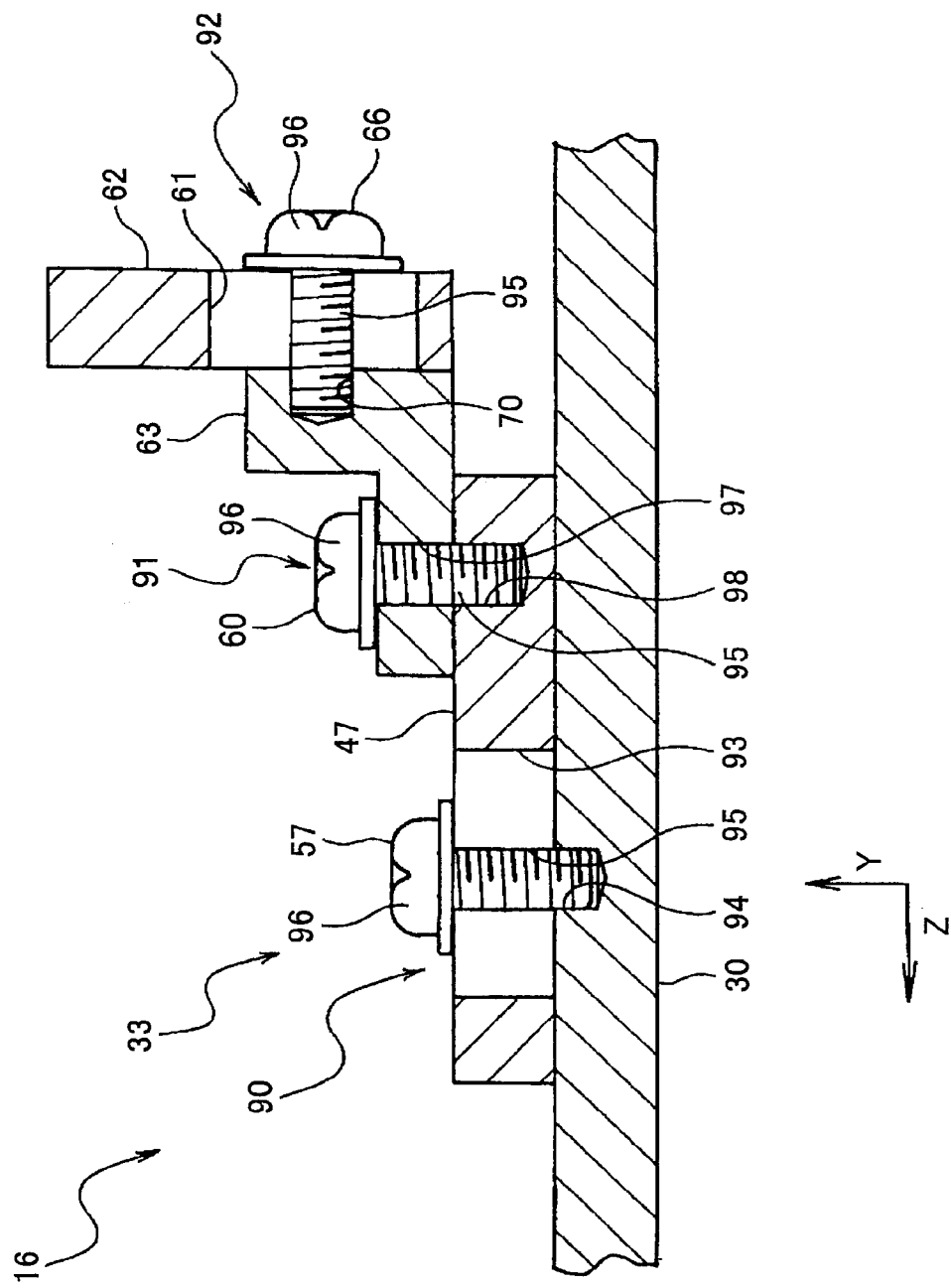
FIG. 16 is a cut-away side view of a core portion of the image reading device 16 shown in FIG. 2 illustrating a modification of the present embodiment.

As shown in FIG. 16, the screw 57 includes the screwing portion 95 screwed into the screw hole 94, and a head 96 located at one end of the screwing portion 95. The screwing portions 95 of the screws 57 pass through the screw through-holes 93, and are screwed into the screw holes 94.

As shown in FIG. 10, the spring washers 86 and the washers 82 have a ring-like shape, and the screwing portions 95 of the screws 57 pass through the inner sides of the spring washers 86 and the washers 82. The spring washers 86 and the washers 82 are located between the loading plate 52 of the cradle 47 and the head 96 of the screw 57, and the spring washers 86 are closer to the heads 96 of the screws 57 than the washers 82. The spring washers 86 urge the heads 96 of the screws 57 to move away from both the loading plate 52 of the cradle 47 and the base member 30.

In the third screw-fixing units 90, the screwing portions 95 of the screws 57 pass through the spring washers 86, the washers 82, and the screw through-holes 93 sequentially, and are screwed into the screw holes 94; thus, the loading plate 52 of the cradle 47 is sandwiched between the heads 96 of the screws 57 and the base member 30, and thereby, the third screw-fixing units 90 fix the cradle 47 and the base member 30.

The positions at which the third screw-fixing units 90 pass through the screw through-holes 93 of the screwing portions 95 can be changed appropriately, and hence, the relative position between the loading plate 52 of the cradle 47 and the base member 30 can be changed as desired in the depth direction Z. As shown in the plan view of the lens block 33 in FIG. 3, plural third screw-fixing units 90 are located at positions symmetric with respect to the optical axis O of the lens 40.

The first screw-fixing units 91 are for fixing the cradle 47 and the intermediate part 63, and include plural screw through-holes 61, plural screw holes 70, screws 60, which correspond to the "screw part" in claims of the present application, spring washers 86, which correspond to the "urge unit" in claims of the present application, and washers 82.

The screw through-holes 61 are formed at the two width direction X ends of the first flat wall 55 to penetrate the flat wall 55. The screw through-holes 61 are elongated holes with the elongated direction thereof parallel to the aforesaid thickness direction Y. In this example, there are two screw through-holes 61, namely, there are two first screw-fixing units 91. The screwing portions 95 of the screws 60 can pass through the inner side of the screw through-holes 61. In addition, the positions at which the screwing portions 95 of the screws 60 pass through the screw through-holes 61 in the thickness direction Y is variable.

The screw holes 70 are formed at the two ends of the second flat wall 67 of the intermediate part 63 in the width direction X, and the screwing portions 95 of the screws 60 are screwed into the screw holes 70. When the first flat wall 55 is superposed on the second flat wall 67, the screw holes 70 are brought to the same positions as the screw through-holes 61.

The screws 60, the spring washers 86, and the washers 82 have the same structures as those of the above-mentioned third screw-fixing units 90. Here, the same reference numbers are assigned to the same elements as described previously, and overlapping descriptions are omitted. In the first screw-fixing units 91, the spring washers 86 urge the heads 96 of the screws 60 to move away from both of the first flat wall 55 and the second flat wall 67.

In the first screw-fixing units 91, the screwing portions 95 of the screws 60 pass through the spring washers 86, the washers 82, and the screw through-holes 61 sequentially, and are screwed into the screw holes 70; thus, the first flat wall 55 is sandwiched between the heads 96 of the screws 57 and the second flat wall 67, and thereby, the first screw-fixing units 91 fix the cradle 47 and the intermediate part 63.

The positions at which the first screw-fixing units 91 pass through the screw through-holes 61 of the screwing portions 95 can be changed appropriately, and hence, the relative position between the first flat wall 55 of the cradle 47 and the second flat wall 67 of the intermediate part 63 can be changed as desired in the thickness direction Y.

As shown in the plan view of the lens block 33 in FIG. 3, plural first screw-fixing units 91 are located at positions symmetric with respect to the optical axis O of the lens 40. In addition, the screw through-holes 61 are formed on the first flat wall 55, and the screw holes 70 are formed on the second flat wall 67, that is to say, the first screw-fixing units 91 are formed on the first flat wall 55 and the second flat wall 67, which are planes perpendicular to the optical axis O and parallel to the thickness direction Y corresponding to the first direction.

The second screw-fixing units 92 are for fixing the intermediate part 63 and the bracket 62, and include plural screw through-holes 97, plural screw holes 98, screws 66, which correspond to the "screw part" in claims of the present application, spring washers 86, which correspond to the "urge unit" in claims of the present application, and washers 82.

The screw through-holes 97 are formed at the two ends of the flat wall 65 of the bracket 62 in the width direction X and penetrate the flat wall 65. The screw through-holes 97 are elongated holes with their elongated direction parallel to the aforesaid width direction X. In this example, there are two screw through-holes 97, namely, there are two second screw-fixing units 92. The screwing portions 95 of the screws 66 can pass through the inner side of the screw through-holes 97. In addition, the positions at which the screwing portions 95 of the screws 66 pass through the screw through-holes 97 in the width direction X is variable.

The screw holes 98 are formed at the two ends of the second flat wall 68 of the intermediate part 63 in the width direction X, and the screwing portions 95 of the screws 66 are screwed into the screw holes 98. When the flat wall 65 of the bracket 62 is superposed on the flat wall 68, the screw holes 98 are brought to the same positions as the screw through-holes 97.

The screws 66, the spring washers 86, and the washers 82 have the same structures as those of the above-mentioned third screw-fixing units 90 and first screw-fixing units 91. Here, the same reference numbers are assigned to the same elements as described previously, and overlapping descriptions are omitted. In the second screw-fixing units 92, the spring washers 86 urge the heads 96 of the screws 66 to move away from both of the flat wall 65 and the flat wall 68.

In the second screw-fixing units 92, the screwing portions 95 of the screws 66 pass through the spring washers 86, the washers 82, and the screw through-holes 97 sequentially, and are screwed into the screw holes 98; thus, the flat wall 65 is sandwiched between the heads 96 of the screws 66 and the flat wall 68, and thereby, the second screw-fixing units 92 fix the intermediate part 63 and the bracket 62.

The positions at which the second screw-fixing units 92 pass through the screw through-holes 97 of the screwing portions 95 can be changed appropriately, and hence, the relative position between the flat wall 65 of the bracket 62 and the flat wall 68 of the intermediate part 63 can be changed as desired in the width direction X.

As shown in the plan view of the lens block 33 in FIG. 3, plural second screw-fixing units 92 are located at positions symmetric with respect to the optical axis O of the lens 40. In addition, the screw through-holes 97 are formed on the flat wall 65, and the screw holes 98 are formed on the flat wall 68, that is to say, the second screw-fixing units 92 are formed on the flat wall 65 and the flat wall 68, which are planes perpendicular to the thickness direction Y and parallel to the width direction X corresponding to the second direction. As shown in FIG. 4, the first position adjustment mechanism 49 has first notches 71 and second notches 72. The first notches 71 are formed at the two ends of the flat wall 55 in the width direction X, namely, the first notches 71 are obtained by cutting off portions at the two ends of the flat wall 55 in the width direction X. The first notches 71 extend, in the width direction X, along a straight line from the two ends of the flat wall 55 in the width direction X to the center of the flat wall 55 in the width direction X.

The second notches 72 are formed at the two ends of the intermediate part 63 in the width direction X; the second notches 72 cut off portions at the two ends of the second flat wall 67 in the width direction X, and cut off portions of the side walls 69. Certainly, when the side walls 69 are absent, the second notches 72 cut off only the portions at the two ends of the second flat wall 67 in the width direction X.

The second notches 72 extend, in the width direction X, along a straight line from the two ends of the second flat wall 67 in the width direction X to the center of the second flat wall 67 in the width direction X. That is, the second notches 72 are parallel to the first notches 71. In addition, when the flat wall 55 and the second flat wall 67 are fixed together, the first notches 71 and the second notches 72 are in communication with each other.

In addition, the distance from the side wall 69 of the second notch 72 to a back side 72a of the second notch 72, which back side 72a is the inner end of the second notch 72 farthest from the side wall 69 of the second notch 72, is greater than the distance from the side wall 69 of the first notch 71 to a back side 71a of the first notch 71, which back side 71a is the inner end of the first notch 71 farthest from the side wall 69 of the first notch 71. In other words, the back side 72a of the second notch 72 is inside the back side 71a of the first notch 71.

Figure 5:
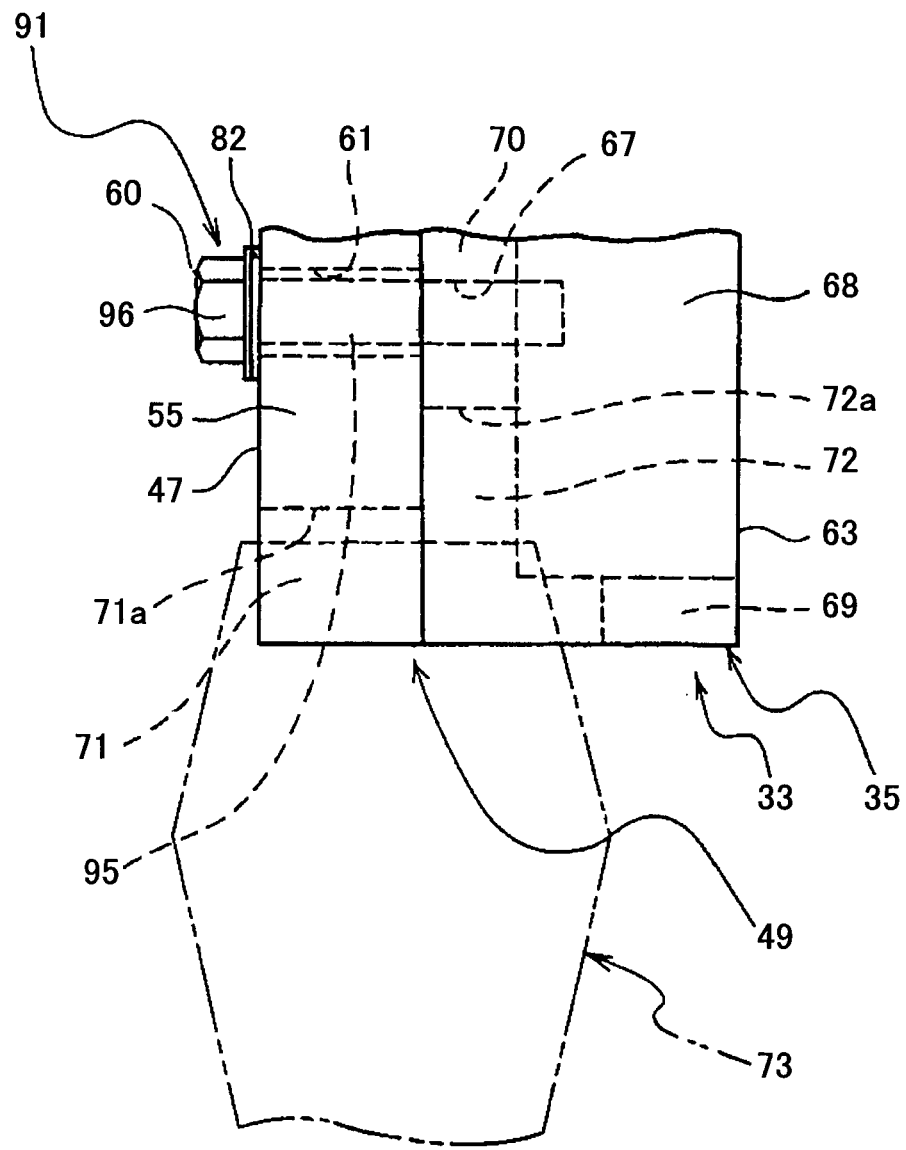
FIG. 5 is a plan view of a portion of the image reading device 16 indicated by a letter "V" in FIG. 2.

FIG. 5 is a plan view of a portion of the image reading device 16 indicated by a letter "V" in FIG. 2.

Figure 6:
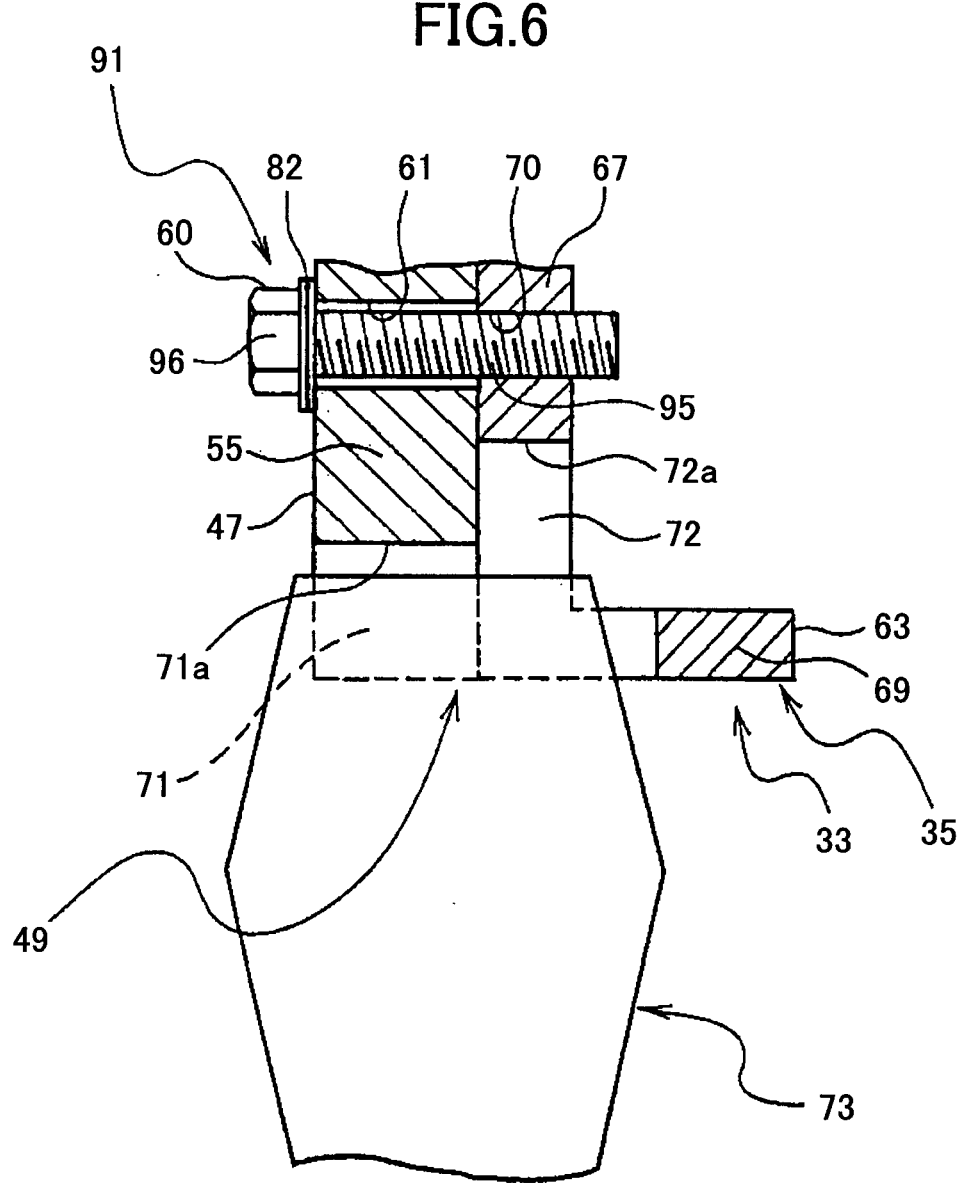
FIG. 6 is a cross-sectional view of a portion of the image reading device 16 illustrating that the end of a driver is inserted into a notch in the image reading device 16.

FIG. 6 is a cross-sectional view of a portion of the image reading device 16 shown in FIG. 5 illustrating that the end of a driver is inserted into a notch in the image reading device 16.

As shown in FIG. 5 and FIG. 6, a tool, for example, the end of the driver 73, is inserted into the first notch 71 and the second notch 72 of the first position adjustment mechanism 49 to adjust the relative position of the cradle 47, that is, the first member in claims of the present application, and the intermediate part 63 of the second member 48. When the end of the driver 73 is operated in the first notch 71 and the second notch 72 of the first position adjustment mechanism 49, the first flat wall 55 of the cradle 47, and the second flat wall 67 of the intermediate part 63 of the second member 48 are moved relative to each other. That is, the first position adjustment mechanism 49 is used to adjust the relative position of the first flat wall 55 of the cradle 47, and the second flat wall 67 of the intermediate part 63 of the second member 48 in the thickness direction Y, which is perpendicular to the longitudinal direction of the first notch 71 and the second notch 72.

In addition, in the first position adjustment mechanism 49, since the first notch 71 and the second notch 72 are formed at the two ends in the width direction X, by appropriately adjusting the method of operating the driver 73 at the two ends, the first position adjustment mechanism 49 can be used to adjust the relative position of the cradle 47 of the image-forming lens system 31, and the intermediate part 63 and the photoelectric conversion element 42 of the second member 48 in the γ direction, which is the rotating direction with respect to the depth direction Z.

As shown in the plan view of the lens block 33 in FIG. 3, plural first position adjustment mechanisms 49 are located at positions symmetric with respect to the optical axis O of the lens 40. In addition, since the first notches 71 are formed on the first flat wall 55, and the second notches 72 are formed on the second flat wall 67, the first position adjustment mechanisms 49 are formed on the first flat wall 55 and the second flat wall 67, which are planes perpendicular to the optical axis O and parallel to the thickness direction Y corresponding to the first direction. As shown in FIG. 3, the second position adjustment mechanism 50 includes a protruding hole 74 at the center of the flat wall 65 of the bracket 62 in the width direction X, and a protruding hole 75 at the center of the flat wall 68 of the intermediate part 63 in the width direction X, so that the protruding hole 74 and the protruding hole 75 are superposed with each other.

Figure 7:
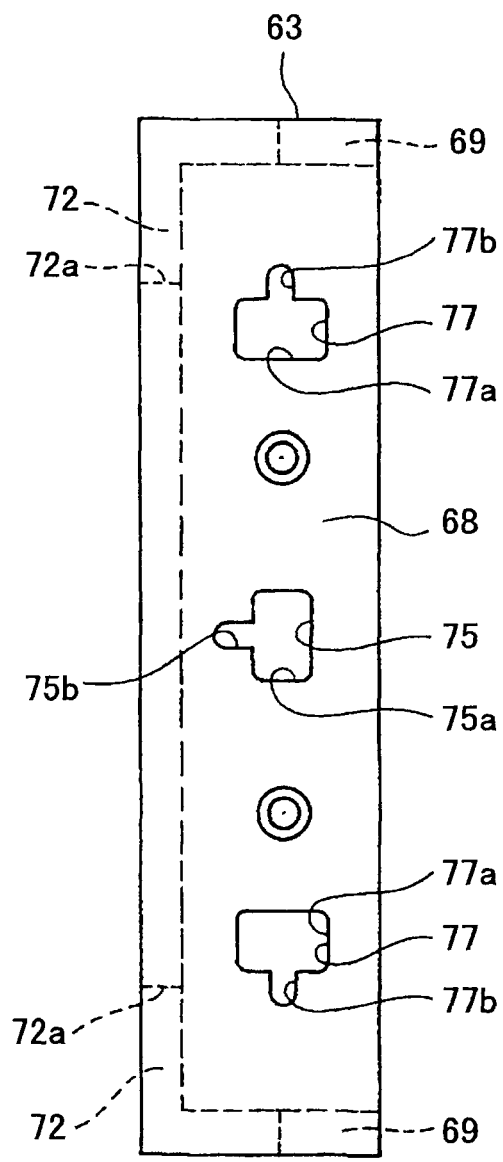
FIG. 7 is a plan view of the intermediate part 63 of the image reading device 16 shown in FIG. 2.

FIG. 7 is a plan view of the intermediate part 63 of the image reading device 16 shown in FIG. 2.

Figure 8:
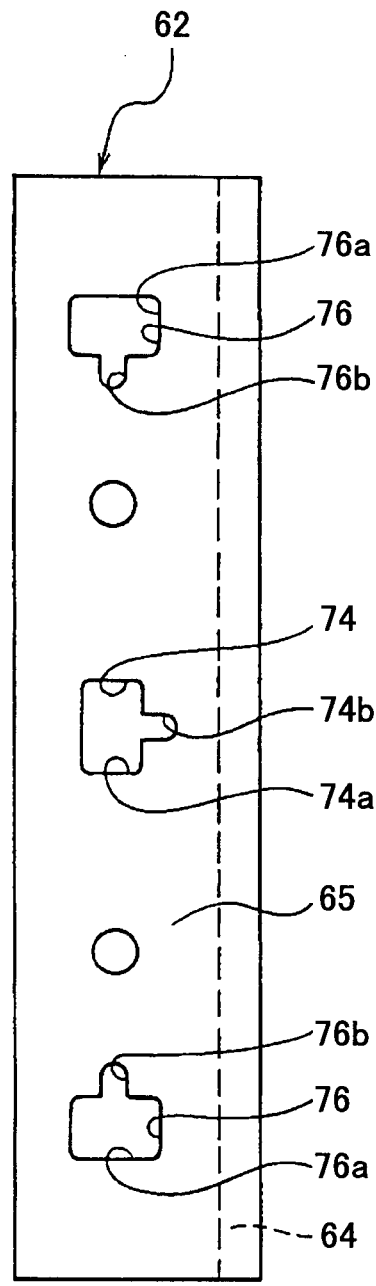
FIG. 8 is a plan view of the bracket 62 of the image reading device 16 shown in FIG. 2.

FIG. 8 is a plan view of the bracket 62 of the image reading device 16 shown in FIG. 2.

As shown in FIG. 7 and FIG. 8, the protruding hole 74 and the protruding hole 75 penetrate through the flat wall 65 of the bracket 62 and the flat wall 68 of the intermediate part 63; the protruding hole 74 and the protruding hole 75 include a rectangular main portion 74a and a rectangular main portion 75a, respectively, and a protruding portion 74b and a protruding portion 75b, respectively, and the protruding portion 74b and the protruding portion 75b linearly protrude from the main portion 74a and the main portion 75a, respectively. The protruding portion 74b protrudes from the main portion 74a in a direction opposite to the direction in which the protruding portion 75b protrudes from the main portion 75a. The longitudinal direction of the protruding portion 74b and the protruding portion 75b is parallel to the depth direction Z. In addition, the protruding portion 74b and the protruding portion 75b of the protruding hole 74 and the protruding hole 75 are exposed to the outside.

When making a relative position adjustment, for example, the end of the driver 73 is inserted into the protruding portion 74b of the protruding hole 74 or the protruding portion 75b of the protruding hole 75 of the second position adjustment mechanism 50. When the end of the driver 73 is operated, the intermediate part 63 of the second member 48, the cradle 47 of the image-forming lens system 31, the bracket 62, and the line-type photoelectric conversion element 42 are moved in the width direction X relative to each other. That is, the second position adjustment mechanism 50 is used to adjust the relative position of the image-forming lens system 31 and the line-type photoelectric conversion element 42 in the width direction X.

The protruding hole 74 is formed on the flat wall 65, and the protruding hole 75 is formed on the flat wall 68; hence, the second position adjustment mechanisms 50 are formed on the flat wall 65 and the flat wall 68, which are planes perpendicular to the thickness direction Y and parallel to the width direction X corresponding to the second direction.

As shown in FIG. 3, the third position adjustment mechanism 51 includes protruding holes 76 at two ends of the flat wall 65 of the bracket 62 in the width direction X, and protruding holes 77 at two ends of the flat wall 68 of the intermediate part 63 in the width direction X; one of the protruding holes 76 and one of the protruding holes 77 are superposed with each other.

As shown in FIG. 7 and FIG. 8, the protruding holes 76 and the protruding holes 77 penetrate through the flat wall 65 of the bracket 62 and the flat wall 68 of the intermediate part 63; each of the protruding holes 76 includes a rectangular main portion 76a and a protruding portion 76b, and the protruding portion 76b linearly protrudes from the main portion 76a. Each of the protruding holes 77 includes a rectangular main portion 77a and a protruding portion 77b, and the protruding portion 77b linearly protrudes from the main portion 77a.

The protruding portions 76b protrude from the main portions 76a in a direction opposite to the direction in which the corresponding protruding portions 77b protrude from the corresponding main portion 77a. The longitudinal direction of the protruding portions 76b and the protruding portions 77b are parallel to the width direction X. In addition, the protruding portions 76b and the protruding portions 77b of the protruding holes 76 and the protruding holes 77 are exposed to the outside.

When making a relative position adjustment, for example, the end of the driver 73 is inserted into one of the protruding portions 76b of the protruding holes 76 or one of the protruding portions 77b of the protruding hole 77 of the third position adjustment mechanism 51. When the end of the driver 73 is operated, the intermediate part 63 of the second member 48, the cradle 47 of the image-forming lens system 31, the bracket 62, and the line-type photoelectric conversion element 42 are moved relative to each other in the depth direction Z and in the β direction, which is the rotating direction with respect to the thickness direction Y. That is, the third position adjustment mechanism 51 is used to adjust the relative position of the image-forming lens system 31 and the line-type photoelectric conversion element 42 in the depth direction Z and in the β direction.

As shown in the plan view of the lens block 33 in FIG. 3, plural third position adjustment mechanisms 51 are located at positions symmetric with respect to the optical axis O of the lens 40. In addition, since the protruding holes 76 are formed on the flat wall 65, and the protruding holes 77 are formed on the flat wall 68, the third position adjustment mechanisms 51 are formed on the flat wall 65 and the flat wall 68, which are planes perpendicular to the thickness direction Y and parallel to the width direction X corresponding to the second direction. In the image reading device 16, which has the configuration as described above, the light reflected from the documents 9, which is directed by the first mirror 13, the second mirror 14, and the third mirror 15, is guided to the photoelectric conversion element 42 of the image sensor 32 by the image-forming lens system 31 to form an image on the photoelectric conversion element 42. The photoelectric conversion element 42 converts the received light signal into electrical signals, and the electrical signals are output to the image processor (not-illustrated).

Figure 9:
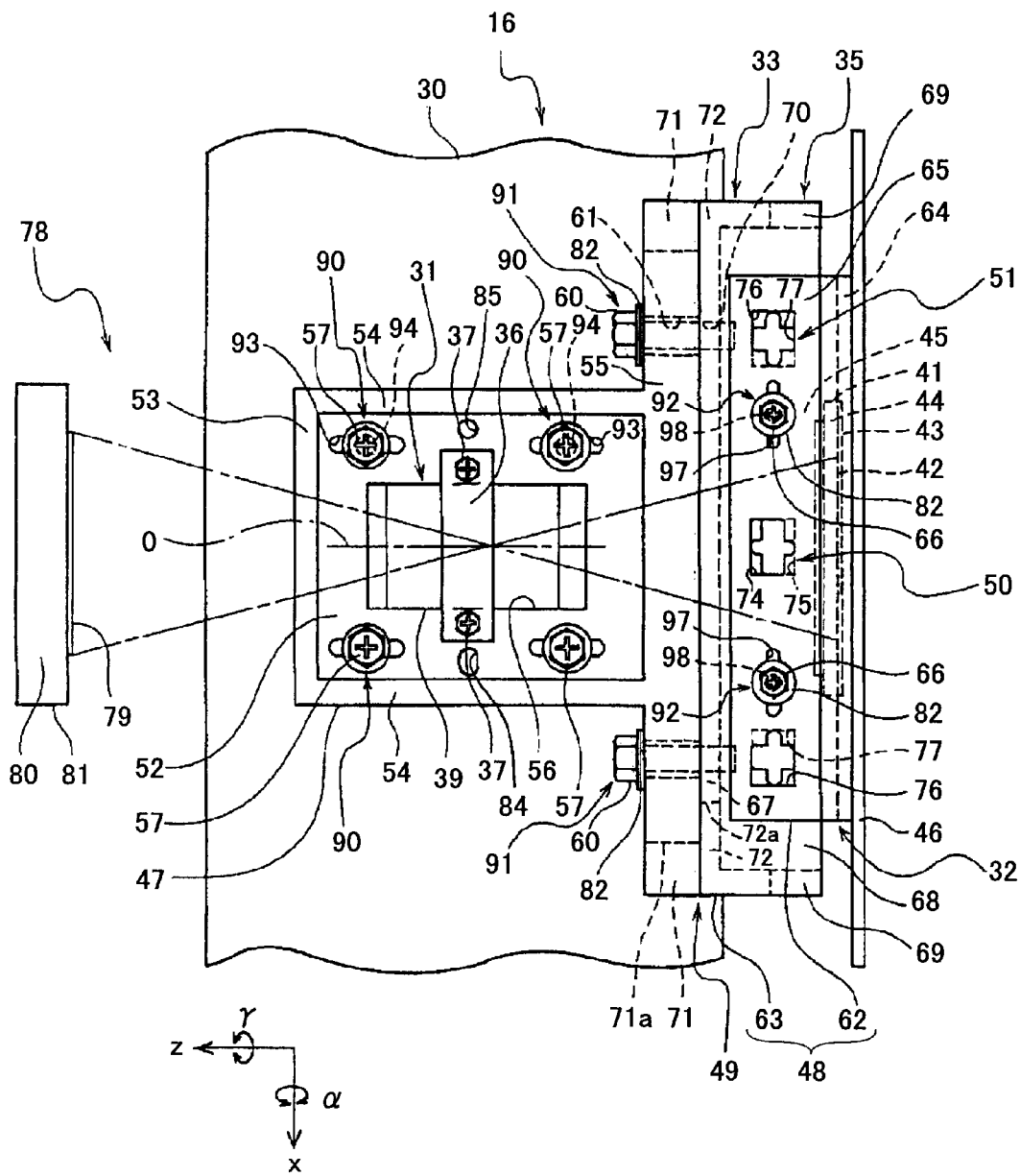
FIG. 9 is a plan view illustrating configurations of an adjustment unit for position adjustment of parts of the image reading device 16.

FIG. 9 is a plan view illustrating configurations of an adjustment unit for position adjustment of parts of the image reading device 16.

As shown in FIG. 9, in the image reading device 16, an adjustment unit 78 is used for adjusting positions of parts of the image reading device 16 following a flow-chart shown in FIG. 14 as described below.

The adjustment unit 78 includes a main body (not illustrated), a reference light source 81, and a controller (not illustrated). The main body is installed on the floor of a factory, and is used to set the position of the cradle 47 and the base member 30, and hence to restrict movement of the cradle 47 and the base member 30.

The reference light source 81 is attached to the main body. As shown in FIG. 9, the reference light source 81 includes a reference chart sheet 79, and a light source 80 formed from a halogen lamp or others. The reference light source 81 directs the light, which is emitted from the light source 80 and transmits through the reference chart sheet 79, to the image sensor 32 of the image reading device 16, which has been set at its position by the main body.

The controller may be a well-known computer having a RAM, a ROM, and a CPU. The controller is connected to the reference light source 81 and the image reading device 16, which has been set at its position by the main body, and controls operations of the reference light source 81 and the image reading device 16, and thereby performs control of the whole adjustment unit 78. In addition, the controller has a display for displaying the image produced by the image sensor 32.

The position adjustment of parts of the image reading device 16 is performed with the adjustment unit 78 in the following way.

Figure 14:
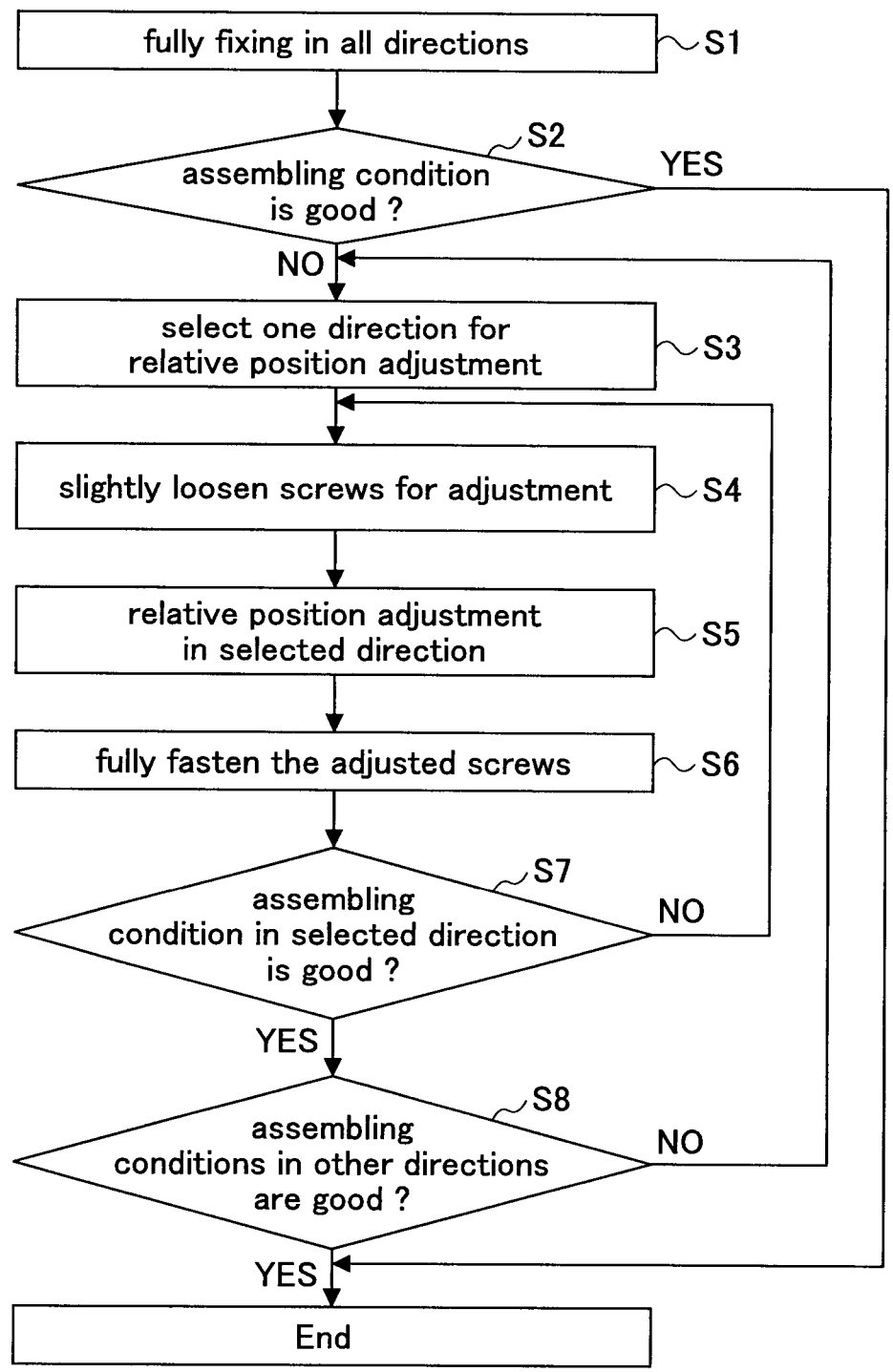
FIG. 14 is a flowchart illustrating a method of assembling the image reading device 16 as shown in FIG. 2.

FIG. 14 is a flowchart illustrating a method of assembling the image reading device 16 as shown in FIG. 2.

First, as described above, the cradle 47 is superposed on the base member 30, and a positioning pin is inserted into the elongated hole 84 and the circular hole 85 to tentatively position the cradle 47 and the base member 30.

As shown in FIG. 14, in step S1, the screws 57, 60, 66 are fully fastened (referred to as "full fastening" or "full fixing") to fix the base member 30, the cradle 47, the intermediate part 63, and the bracket 62 in the image reading device 16 to position the image reading device 16 in the main body 2 of the image forming device 1.

FIG. 10 is a perspective view of the screws used in the image reading device 16 shown in FIG. 2.

In the present embodiment, the springy washer 86 and the washer 82 (as shown in FIG. 10), which serve as the urging unit in claims of the present application, are provided between the head 96 of the screw 57 and the loading plate 52 of the cradle 47, between the head 96 of the screw 60 and the first flat wall 55, and between the head 96 of the screw 66 and the flat wall 65.

Further, the screws 57, 60, 66 are fully fastened by imposing a fastening force equal to the force for complete fastening. Under these conditions, since the inner diameters of the screw through-holes 61, 93, 97 are greater than the outer diameters of the screwing portions 95 of the screws 57, 60, 66, the cradle 47, the intermediate part 63, and the bracket 62 are able to move more or less relative to each other.

As shown in FIG. 10, the heads 96 of the screws 57, 60, 66 are hexagonal column-shaped.

Next, with the movement of the cradle 47 and the base member 30 being restricted, light is emitted from the light source 80 of the reference light source 81, and the light passes through the lenses 40 of the image-forming lens system 31, and is received by the photoelectric conversion element 42 of the image sensor 32.

In step S2, it is determined whether a desired signal is obtained from the photoelectric conversion element 42.

If it is determined that the desired signal is obtained from the photoelectric conversion element 42, the position adjustment procedure is finished; otherwise, the procedure proceeds to step S3.

In step S3, one direction is selected from the thickness direction Y, the width direction X, and the depth direction Z, in which direction the desired signal is obtainable from the photoelectric conversion element 42.

In step S4, the screws 57, 60, 66 of the third screw-fixing units 90, the first screw-fixing units 91, and the second screw-fixing units 92 corresponding to the selected direction, are loosened slightly, for example, by imposing a torque equaling 30% of the torque for fully fixing (full fastening) the screws 57, 60, 66.

In step S5, an operator, while viewing the display, inserts the end of the driver 73 into the first position adjustment mechanism 49, the second position adjustment mechanism 50, and the third position adjustment mechanism 51, and operates the end of the driver 73 to move the base member 30, the cradle 47, the intermediate part 63, and the bracket 62 relative to each other in the width direction X, the thickness direction Y, the depth direction Z, the β direction, and the γ direction.

In step S6, when a signal is obtained from the line-type photoelectric conversion element 42, which indicates that the base member 30, the cradle 47, the intermediate part 63, and the bracket 62 are at their normal positions in the selected direction, the loosened screws 57, 60, or 66 of the third screw-fixing units 90, the first screw-fixing units 91, or the second screw-fixing units 92 are fully fastened.

In step S7, it is determined again whether the signal indicating that the above components are at normal positions in the selected direction is obtained from the line-type photoelectric conversion element 42.

When it is determined that the signal is obtained, the routine proceeds to step S8; otherwise, the routine returns to step S4 to repeat steps S4 through S7.

In step S8, it is determined whether the desired signal is obtained from the photoelectric conversion element 42.

If it is determined that the desired signal is obtained from the photoelectric conversion element 42, the routine is finished; otherwise, the routine returns to step S3, and one direction is selected from the un-adjusted thickness direction Y, the width direction X, and the depth direction Z for adjustment. Then, in this way, steps S3 through S8 are repeated to adjust the relative positions between the base member 30, the cradle 47, the intermediate part 63, and the bracket 62 in all of the thickness direction Y, the width direction X, and the depth direction Z until the desired signal is obtained from the photoelectric conversion element 42. In the present embodiment, certainly, the screws 57, 60, 66 of the third screw-fixing units 90, the first screw-fixing units 91, and the second screw-fixing units 92 corresponding to the selected direction among the thickness direction Y, the width direction X, and the depth direction Z are tentatively fastened, and the screws 57, 60, 66 of the third screw-fixing units 90, the first screw-fixing units 91, and the second screw-fixing units 92 corresponding to other directions of the thickness direction Y, the width direction X, and the depth direction Z, in which adjustment is not made, are fully fastened.

In this way, at positions where the desired signal is obtained from the photoelectric conversion element 42, the relative position adjustment of the base member 30, the cradle 47, the intermediate part 63, and the bracket 62 is completed. Then, the screws 57, 60, 66 are fastened (full fastening) to fully fix the base member 30, the cradle 47, the intermediate part 63, and the bracket 62 relative to each other, thereby, assembling the lens block 33 as described above.

In the image forming device 1 of the present embodiment, the ADF 3 automatically feeds the documents 9 onto the contact glass 10 of the scanner 4, and delivers the documents 9 from the contact glass 10 out of the main body 2 after the documents 9 are read by the image reading device 16. In the image forming device 1, the scanner 4 emits light onto the document 9 set on the contact glass 10, and the light reflected from the documents 9 is received by the line-type photoelectric conversion element 42 and is converted into electrical signals.

In the image forming device 1, the writing unit 6 writes an image on the photoconductive drum 26 based on image signals, which are obtained by the scanner 4, and correspond to the reflection image of document 9. Then the image is transferred to and fused on the paper 21, which is fed from the paper feeder 5. The image forming device 1 delivers the paper 21 with the fused image thereon out of the main body 2.

According to the present embodiment, since the back side 72a of the second notch 72 of the second member 48 is inside the back side 71a of the first notch 71 of the cradle 47, when the tool 73 is inserted into the first notch 71 and the second notch 72, the tool 72 does not touch the back side 72a of the second notch 72 formed in the second member 48. Due to this, when adjusting the relative position of the cradle 47 and the second member 48, it is possible to prevent the second member 48 from being moved unexpectedly. In other words, when adjusting the relative position of the cradle 47 and the second member 48, it is possible to prevent the second member 48 from being moved in an unintended direction, and this reduces the workload of adjusting the relative position of the cradle 47 and the second member 48.

Since the cradle 47 has an attaching surface, which corresponds to the lower surface of the loading plate 52, and the second member 48 is supported by the cradle 47, it is possible to make adjustments while attaching the cradle 47 to the base member 30; thus, it is possible to perform stable adjustment.

In addition, according to the present embodiment, when adjusting the relative position of the cradle 47 and the second member 48, the movement of the second member 48 is not restricted, while the movement of the cradle 47 is restricted; in addition, the distance from the side wall 69 of the second notch 72 to the back side 72a of the second notch 72 is greater than the distance from the side wall 69 of the first notch 71 to the back side 71a of the first notch 71. Due to this, when the tool 73 is inserted into the first notch 71 and the second notch 73, the end of the tool 73 does not touch the back side 72a of the second notch 72 and the intermediate part 63 of the second member 48. Therefore, when adjusting the relative position of the cradle 47 and the second member 48 in a direction perpendicular to a longitudinal direction of the first notch 71 and the second notch 72, it is possible to prevent the intermediate part 63 of the second member 48, the movement of which is not restricted, from being moved unexpectedly in the longitudinal direction of the first notch 71 and the second notch 72. Thus, when adjusting the relative position of the cradle 47 and the intermediate part 63 of the second member 48, it is possible to prevent the intermediate part 63 of the second member 48 from being moved in an unintended direction, and this reduces the workload of adjusting the relative position of the cradle 47 and the intermediate part 63.

Since the tool 73 is inserted into the first notch 71 and the second notch 72, which are formed in the cradle 47 and the intermediate part 63 of the second member 48, respectively, to adjust the relative position of the cradle 47 and the intermediate part 63, even when the screw 60 for fixing the cradle 47 and the intermediate part 63 of the second member 48 is strongly fastened, it is still possible to adjust the relative position of the cradle 47 and the intermediate part 63 of the second member 48 easily. As a result, it is possible to perform relative position adjustment of the cradle 47 and the intermediate part 63 of the second member 48 at high relative position precision.

In addition, since the springy washer 86 is provided between the head of the screw 60 and the first flat wall 55, the springy washer 86 constantly urges the flat walls 55, 67 to approach each other. Due to this, when fastening the screw 60, the size of the change, along with the rotational angle of the screw 60, of the fastening force imposed on the screw 60 is reduced, and this makes it easy to control the touch of fastening the screw 60.

According to the present embodiment, since the lens block 33 has the fixture structure 35 as described above, it is possible to reduce the workload of adjusting the relative position of the lenses 40 and the line-type photoelectric conversion element 42, especially when high relative position precision is required.

In addition, since the cradle 47 is attached to the lens tube 39, and the bracket 62 of the second member 48 is attached to the package 41 through the printing wiring board 46, it is possible to reliably adjust the relative position of the lenses 40 and the line-type photoelectric conversion element 42.

In addition, since the intermediate part 63 is attached to the package 41 via the bracket 62, and the second flat wall 67 and the second notch 72 are both provided in the intermediate part 63, it is possible to reliably adjust the relative position of the lenses 40 and the line-type photoelectric conversion element 42.

In addition, since the first flat wall 55 of the cradle 47 is provided to stand on the loading plate 52, to which the lens tube 39 is attached, it is possible to reliably adjust the relative position of the lenses 40 and the line-type photoelectric conversion element 42.

In addition, since the heads of the screws 37, 57, 60, 66 are hexagonal column-shaped, when fastening the screws 37, 57, 60, 66, there is no force imposed along the axial direction of the screws, hence, it is possible to reduce variation during fastening. Further, since the springy washer 86 is provided, the fastening force on the screws 60, 66 is stable during the adjustment, and this can also reduce variation during fastening.

According to the image reading device 16 and the image forming device 1 of the present embodiment, since the lens block 33 has the fixture structure 35 as described above, when adjusting the relative position of the cradle 47 and the intermediate part 63 of the second member 48, it is possible to prevent the intermediate part 63 of the second member 48 from being moved in an unintended direction, and this reduces the workload of adjusting the relative position of the cradle 47 and the intermediate part 63.

Since the first position adjustment mechanisms 49 are formed on the first flat wall 55 and the second flat wall 67 which are planes parallel to the thickness direction Y, when the first position adjustment mechanisms 49 are used for position adjustment, the cradle 47 and the intermediate part 63 move relatively only in the thickness direction Y, but do not move relatively in the width direction X, which is the second direction, and the depth direction Z, which is the third direction.

Furthermore, since the second position adjustment mechanisms 50 are formed on the flat wall 65 and the flat wall 68 which are planes parallel to the width direction X, when the second position adjustment mechanisms 50 are used for position adjustment, the bracket 62 and the intermediate part 63 move relatively only in the width thickness direction X, but do not move relatively in the thickness direction Y, which is the first direction, and the depth direction Z, which is the third direction.

For this reason, when adjusting the relative positions of the cradle 47, the intermediate part 63, and the bracket 62 in the thickness direction Y, it is sufficient to only use the first position adjustment mechanisms 49, but not necessary to use the third position adjustment mechanisms 51; while when adjusting the relative positions in the width direction X, it is sufficient to only use the second position adjustment mechanisms 50, but not necessary to use the first position adjustment mechanisms 49.

That is to say, it is possible to adjust the relative positions of the cradle 47, the intermediate part 63, and the bracket 62 with adjustment in the width direction X independent from that in the thickness direction Y, and this makes the position adjustment easy. Moreover, when it is required to re-adjust the relative position of the above components, the time required for the re-adjustment can be reduced. Consequently, when adjusting the relative positions of the cradle 47, the intermediate part 63, and the bracket 62, it is possible to perform the position adjustment independently in the width direction X and in the thickness direction Y, and it is possible to reduce the workload of adjusting the relative positions of the cradle 47, the intermediate part 63, and the bracket 62.

Since the cradle 47, the intermediate part 63, and the bracket 62 are provided, and the third position adjustment mechanisms 51 are formed on the intermediate part 63 and the bracket 62, when making relative position adjustment in the thickness direction Y, it is sufficient to use the first position adjustment mechanisms 49 only to adjust the relative position of the cradle 47 and the intermediate part 63; when making relative position adjustment in the width direction X, it is sufficient to use the second position adjustment mechanisms 50 only to adjust the relative position of the bracket 62 and the intermediate part 63. Due to this, for the cradle 47, the intermediate part 63, and the bracket 62, the relative positions of which are adjusted, the relative positions of these components is adjusted in only one direction, and the cradle 47, the intermediate part 63, and the bracket 62 do not move relatively in plural directions. Consequently, it is possible to reduce the workload of position adjustment, and reduce the time required for assembling the lens block 33.

Since there are provided the first screw-fixing unit 91 for fixing the cradle 47 and the intermediate part 63, and the second screw-fixing unit 92 for fixing the intermediate part 63 and the bracket 62, after the first position adjustment mechanisms 49 adjusts the relative position of the cradle 47 and the intermediate part 63 in the thickness direction Y, the first screw-fixing unit 91 can then fix the cradle 47 and the intermediate part 63; and after the third position adjustment mechanisms 51 adjusts the relative position between the bracket 62 and the intermediate part 63, the second screw-fixing unit 92 can then fix the bracket 62 and the intermediate part 63.

Therefore, when only the first position adjustment mechanisms 49 are used to adjust the relative position of the cradle 47 and the intermediate part 63, after the adjustment, it is sufficient to use only the first screw-fixing unit 91 to fix the cradle 47 and the intermediate part 63; and when only the third position adjustment mechanisms 51 are used to adjust the relative position between the bracket 62 and the intermediate part 63, after the adjustment, it is sufficient to use only the second screw-fixing unit 92 to fix the bracket 62 and the intermediate part 63.

Therefore, the cradle 47, the intermediate part 63, and the bracket 62 can be fixed with position adjustment in the thickness direction Y independent from that in the width direction X. This makes the relative position adjustment of the cradle 47, the intermediate part 63, and the bracket 62 easy; moreover, even when it is required to re-adjust the relative position of the cradle 47, the intermediate part 63, and the bracket 62, the time required for the re-adjustment can be reduced. Consequently, when adjusting the relative position of the cradle 47, the intermediate part 63, and the bracket 62, it is possible to adjust the positions of and fix the cradle 47, the intermediate part 63, and the bracket 62 in different directions with position adjustment and fixing in different directions independent from each other, and it is possible to reduce the workload of adjusting the relative position of the cradle 47, the intermediate part 63, and the bracket 62.

Since the lens block 33 includes the above-described fixture structure 35, it is possible to reduce the workload of adjusting the relative position of the optical elements, especially when high relative position precision is required for the optical elements, such as a lens or a photoelectric conversion unit.

Since plural first position adjustment mechanisms 49 are located at positions symmetric with respect to the optical axis O of the lens 40, when the first position adjustment mechanisms 49 is used for position adjustment of the cradle 47 and the intermediate part 63, the movement distances of the cradle 47 and the intermediate part 63 are symmetric with respect to the optical axis O of the lens 40.

Since plural third position adjustment mechanisms 51 are located at positions symmetric with respect to the optical axis O of the lens 40, when the third position adjustment mechanisms 51 are used for position adjustment of the bracket 62 and the intermediate part 63, the movement distances of the bracket 62 and the intermediate part 63 are symmetric with respect to the optical axis O of the lens 40. Therefore, it becomes easy to adjust the relative positions of the cradle 47, the bracket 62, and the intermediate part 63, and it is possible to reduce the workload of adjusting the relative positions of the cradle 47, the bracket 62, and the intermediate part 63.

Since the first screw-fixing unit 91 is located at positions symmetric with respect to the optical axis O of the lens 40, when fixing the cradle 47 and the intermediate part 63, the relative position deviation of the cradle 47 and the intermediate part 63, which deviation occurs when the screws 60 are fastened, are symmetric with respect to the optical axis O of the lens 40.

Since the second screw-fixing unit 92 is located at positions symmetric with respect to the optical axis O of the lens 40, when fixing the bracket 62 and the intermediate part 63, the relative position deviation of the bracket 62 and the intermediate part 63, which deviation occurs when the screws 66 are fastened, are symmetric with respect to the optical axis O of the lens 40.

Since the third screw-fixing unit 90 is located at positions symmetric with respect to the optical axis O of the lens 40, when fixing the cradle 47 and the base member 30, the relative position deviation of the cradle 47 and the base member 30, which deviation occurs when the screws 57 are fastened, are symmetric with respect to the optical axis O of the lens 40.

Therefore, it is possible to easily predict the relative position deviation of the base member 30, the cradle 47, the bracket 62, and the intermediate part 63 when the screws 57, 60, 66 are fastened, and it is possible to certainly reduce the time for adjusting relative positions of the base member 30, the cradle 47, the bracket 62, and the intermediate part 63.

Since the first screw-fixing unit 91, the second screw-fixing unit 92, and the third screw-fixing unit 90 have the spring washers 86, which urge the head 96 of the screws to move away, it is possible to stabilize the torque for fastening the screws 57, 60, 66 when the first screw-fixing unit 91, the second screw-fixing unit 92, and the third screw-fixing unit 90 tentatively fix the base member 30, the cradle 47, the bracket 62, and the intermediate part 63, and it is possible to prevent relative position deviation of the base member 30, the cradle 47, the bracket 62, and the intermediate part 63 when fully fastening the screws 57, 60, 66 to fully fix the base member 30, the cradle 47, the bracket 62, and the intermediate part 63. Therefore, it is possible to reduce the number of times of adjusting the relative positions of the base member 30, the cradle 47, the bracket 62, and the intermediate part 63, and to surely reduce the time for adjusting the relative positions of the base member 30, the cradle 47, the bracket 62, and the intermediate part 63.

According to the method of assembling the lens block 33 of the present embodiment, first, all of the first screw-fixing unit 91, the second screw-fixing unit 92, and the third screw-fixing unit 90 are fully fixed (full fixing), then, one of the first screw-fixing unit 91, the second screw-fixing unit 92, and the third screw-fixing unit 90 is loosened, which corresponds to the direction in which relative position adjustment is to be made, and then the relative position adjustment is made in the direction. Therefore, during the relative position adjustment, it is possible to prevent relative position deviation of the base member 30, the cradle 47, the bracket 62, and the intermediate part 63 in directions other than the direction in which the relative position adjustment is being made, and prevent the relative position deviation of the base member 30, the cradle 47, the bracket 62, and the intermediate part 63 when fastening the screws 57, 60, 66 after the relative position adjustment. Consequently, it is possible to reduce the number of times making the relative position adjustment of the base member 30, the cradle 47, the bracket 62, and the intermediate part 63, and to reduce the time for assembling the lens block 33.

Since the image reading device 16 and the image forming device 1 of the present embodiment include the above-described lens block 33, when adjusting the relative positions of the base member 30, the cradle 47, the bracket 62, and the intermediate part 63, it is possible to prevent movement of the base member 30, the cradle 47, the bracket 62, and the intermediate part 63 in directions different from the intended direction, and this reduces the workload of adjusting the relative position of the base member 30, the cradle 47, the bracket 62, and the intermediate part 63.

In the above embodiment, when assembling the lens block 33, first, all of the first screw-fixing unit 91, the second screw-fixing unit 92, and the third screw-fixing unit 90 are fully fixed (full fixing); then one of the first screw-fixing unit 91, the second screw-fixing unit 92, and the third screw-fixing unit 90 is loosened, and then the relative position adjustment is made in this direction. However, as described below, the present embodiment is not limited to this method.

Figure 15:
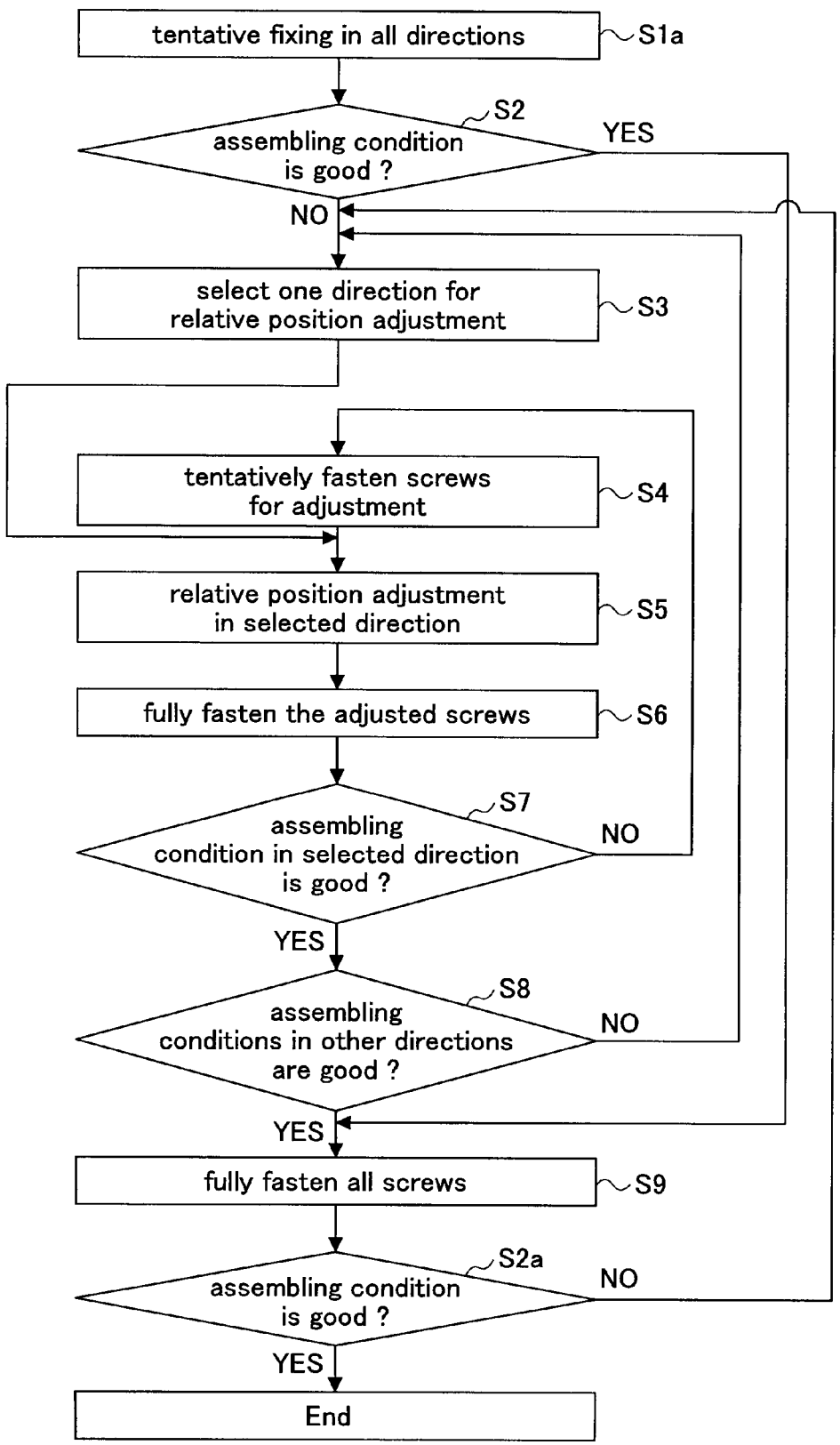
FIG. 15 is a flowchart illustrating another method of assembling the image reading device 16 as shown in FIG. 2.

FIG. 15 is a flowchart illustrating another method of assembling the image reading device 16 as shown in FIG. 2.

In FIG. 15, the same reference numbers are assigned to the same elements as those described previously, and overlapping descriptions are omitted.

In the method illustrated in FIG. 15, first, the first screw-fixing unit 91, the second screw-fixing unit 92, and the third screw-fixing unit 90 are tentatively fixed (tentative fixing), then, the first position adjustment mechanism 49, the second position adjustment mechanism 50, and the third position adjustment mechanism 51 are used to adjust the relative positions of the base member 30, the cradle 47, the bracket 62, and the intermediate part 63.

Specifically, as shown in FIG. 15, in step S1a, the screws 57, 60, 66 are mildly fastened (tentative fastening) to tentatively fix (tentative fixing) the base member 30, the cradle 47, the intermediate part 63, and the bracket 62. For example, a torque equaling 30% of the torque for fully fixing (full fixing) the screws 57, 60, 66 is imposed to fasten the screws 57, 60, 66. Consequently, the image reading device 16, in which the base member 30, the cradle 47, the intermediate part 63, and the bracket 62 are relatively tentatively fixed, is positioned in the main body 2 of the image forming device 1. Under this condition, since the inner diameters of the screw through-holes 61, 93, 97 are greater than the outer diameters of the screwing portions 95 of the screws 57, 60, 66, the base member 30, the cradle 47, the intermediate part 63, and the bracket 62 are able to move relative to each other.

Then, with the movement of the cradle 47 and the base member 30 being restricted, light is emitted from the light source 80 of the reference light source 81, and the light passes through the lenses 40 of the image-forming lens system 31, and is received by the photoelectric conversion element 42 of the image sensor 32.

In step S2, it is determined whether a desired signal is obtained from the photoelectric conversion element 42.

If the desired signal is obtained from the photoelectric conversion element 42, the position adjustment procedure proceeds to step S9, otherwise, the procedure proceeds to step S3.

In step S3, one direction is selected from the thickness direction Y, the width direction X, and the depth direction Z, in which direction the desired signal can be obtained from the photoelectric conversion element 42. Then, the procedure proceeds to step S5.

In step S4, the screws 57, 60, 66 of the third screw-fixing units 90, the first screw-fixing units 91, and the second screw-fixing units 92 corresponding to the selected direction, are loosened slightly, for example, by imposing a torque equaling 30% of the torque for fully fixing (full fastening) the screws 57, 60, 66.

In step S5, an operator, while viewing the display, inserts the end of the driver 73 into the first position adjustment mechanism 49, the second position adjustment mechanism 50, and the third position adjustment mechanism 51, and operates the end of the driver 73 to move the base member 30, the cradle 47, the intermediate part 63, and the bracket 62 relative to each other in the width direction X, the thickness direction Y, the depth direction Z, the β direction, and the γ direction.

In step S6, when a signal is obtained from the line-type photoelectric conversion element 42, which indicates that the base member 30, the cradle 47, the intermediate part 63, and the bracket 62 are at their normal positions in the selected direction, the loosened screws 57, 60, or 66 of the third screw-fixing units 90, the first screw-fixing units 91, or the second screw-fixing units 92 are fully fastened.

In step S7, it is determined again whether the signal, which indicates that the base member 30, the cradle 47, the intermediate part 63, and the bracket 62 are at normal positions in the selected direction, is obtained from the line-type photoelectric conversion element 42.

If the signal is obtained, the procedure proceeds to step S8; otherwise, the procedure returns to step S4 to repeat steps S4 through S7.

In step S8, it is determined whether the desired signal is obtained from the photoelectric conversion element 42.

If the desired signal is obtained from the photoelectric conversion element 42, the procedure proceeds to step S9.

If the desired signal is not obtained from the photoelectric conversion element 42, the procedure returns to step S3, and one direction is selected from the un-adjusted thickness direction Y, the width direction X, and the depth direction Z for adjustment, and the steps S3 through S8 are repeated.

In step S9, the screws 57, 60, and 66 of all of the third screw-fixing units 90, the first screw-fixing units 91, and the second screw-fixing units 92 are fully fastened. Then the procedure proceeds to step S2a.

In step S2a, it is determined whether the desired signal is obtained from the photoelectric conversion element 42.

If the desired signal is obtained from the photoelectric conversion element 42, the routine is finished; otherwise, the routine returns to step S3, and one direction is selected from the un-adjusted thickness direction Y, the width direction X, and the depth direction Z for adjustment, then, in this way, the steps S3 through S8 are repeated to adjust the relative positions between the base member 30, the cradle 47, the intermediate part 63, and the bracket 62 in all of the thickness direction Y, the width direction X, and the depth direction Z until the desired signal is obtained from the photoelectric conversion element 42.

In this way, at positions where the desired signal is obtained from the photoelectric conversion element 42, the relative position adjustment of the base member 30, the cradle 47, the intermediate part 63, and the bracket 62 is completed. Then, the screws 57, 60, 66 are fastened (full fastening) to fully fix the base member 30, the cradle 47, the intermediate part 63, and the bracket 62 relative to each other, thereby assembling the lens block 33 as described above.

In the method illustrated in FIG. 15, first, the first screw-fixing unit 91, the second screw-fixing unit 92, and the third screw-fixing unit 90 are tentatively fixed (tentative fixing), then, the relative positions of the base member 30, the cradle 47, the bracket 62, and the intermediate part 63 are adjusted, and then, the first screw-fixing unit 91, the second screw-fixing unit 92, and the third screw-fixing unit 90 are fully fixed (full fixing). Therefore, during the relative position adjustment, it is not necessary to loosen the fully fastened first screw-fixing unit 91, the second screw-fixing unit 92, and the third screw-fixing unit 90, thus, it is possible to reduce the workload of adjusting the relative positions of the base member 30, the cradle 47, the bracket 62, and the intermediate part 63, and to reduce the time for assembling the lens block 33.

FIG. 16 is a cut-away side view of a core portion of the image reading device 16 shown in FIG. 2 illustrating a modification of the present embodiment.

In FIG. 16, the same reference numbers are assigned to the same elements as described previously, and overlapping descriptions are omitted.

As shown in FIG. 16, the cradle 47, the bracket 62, and the intermediate part 63 of the lens block 33 are fixed in order, specifically, in ascending order of the distances of the cradle 47, the bracket 62, and the intermediate part 63 to the base member 30.

Therefore, after the cradle 47, the bracket 62, and the intermediate part 63 are adjusted, it is not necessary to re-adjust them; this reduces the number of times of position adjustment, and reduces the time for assembling the lens block 33.

According to the present embodiment, since the base member 30, the cradle 47 (corresponding to the first member), the bracket 62 (corresponding to the third member), and the intermediate part 63 (corresponding to the second member) are fully fixed or tentatively fixed, when adjusting the relative positions of the base member 30, the cradle 47, the bracket 62, and the intermediate part 63 to assemble the lens block 33, the base member 30, the cradle 47, the bracket 62, and the intermediate part 63 are adjusted and fixed in ascending order of the distances of the cradle 47, the bracket 62, and the intermediate part 63 to the base member 30.

In comparison with the present embodiment, if the relative positions of the base member 30, the cradle 47, the bracket 62, and the intermediate part 63 are adjusted and then the base member 30, the cradle 47, the bracket 62, and the intermediate part 63 are fixed in descending order of the distances of the cradle 47, the bracket 62, and the intermediate part 63 to the base member 30, due to reactions of adjustment and fixing of components far from the base member 30, the components close to the base member 30 may move relative to each other.

According to the present embodiment, it is possible to prevent the relative position deviation of the components close to the base member 30, and prevent unintended position deviation of the components under adjustment. Furthermore, it is not necessary to make re-adjustment, and this reduces the time for making adjustment.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

Figure 11:
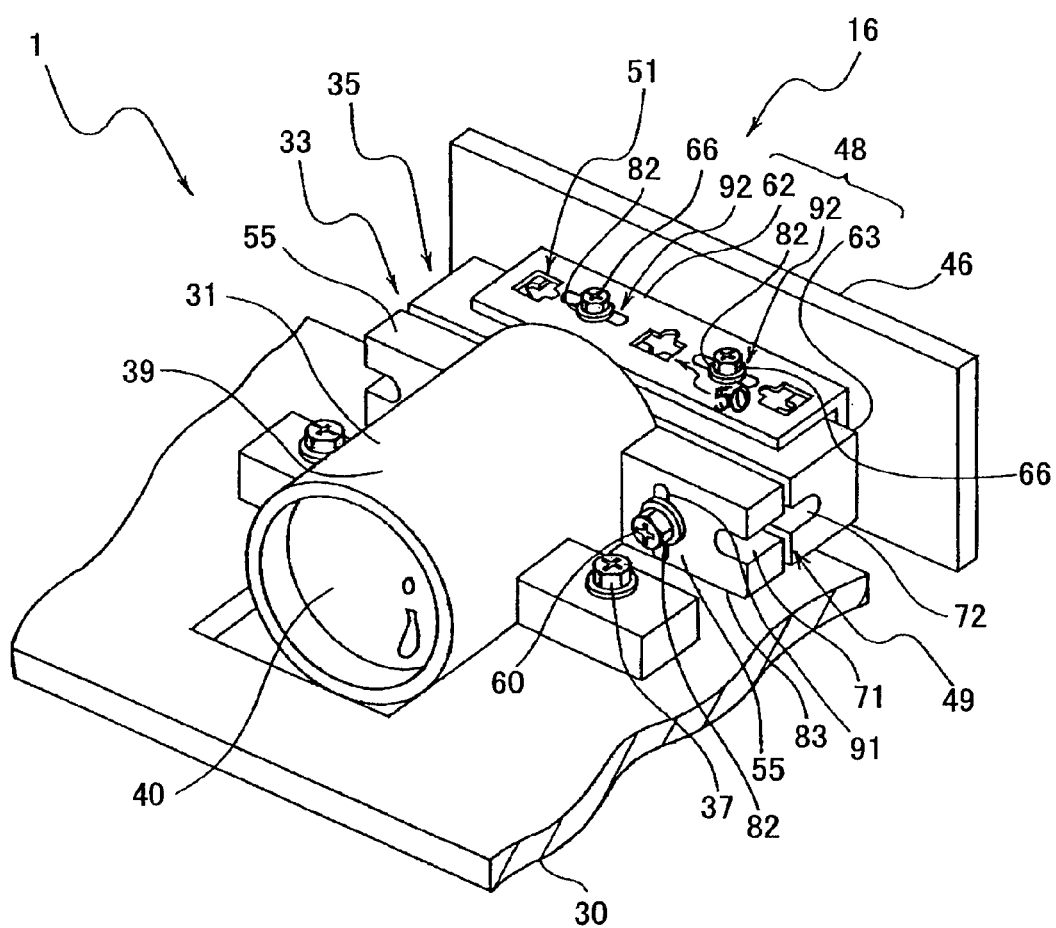
FIG. 11 is a perspective view illustrating a modification of the image reading device 16.

FIG. 11 is perspective view illustrating a modification of the image reading device 16.

As shown in FIG. 11, a first member 83 has a pair of the first flat walls 55 that are formed on the outer surface of the lens tube 39 and extend from the outer surface of the lens tube 39 to the outside. In FIG. 11, the same reference numbers are assigned to the same elements as those described previously, and overlapping descriptions are omitted.

In the example shown in FIG. 11, since the first flat walls 55, which have the first notch 71, are formed on the outer surface of the lens tube 39, it is possible to reliably adjust the relative position of the lenses 40 and the line-type photoelectric conversion element 42.

In the example shown in FIG. 11, it is preferable to form the elongated hole 84 and the circular hole 85, which are not illustrated in FIG. 11. In this case, the elongated hole 84 and the circular hole 85 may be formed on the inner side of the screw 37 or on the outer side of the screw 37.

In the above embodiments, a wave washer serving as urging means may be provided between the head of the screw 60 and the first flat wall 55, and between the head of the screw 66 and the flat wall 65.

In the above embodiments, when fastening the screws 60 and 66, it is preferable to appropriately adjust the level of the tentative fastening depending on size of the screws 60 and 66 and size of the cradle 47 and the intermediate part 63. Further, when the screws 60 and 66 are fastened, and the cradle 47, the intermediate part 63, and the bracket 62 are moved relative to each other, since residual stress occurs between the cradle 47, the intermediate part 63, and the bracket 62, it is preferable to reduce position shifts of these elements during the full fastening as much as possible within an allowable range.

Figure 12:
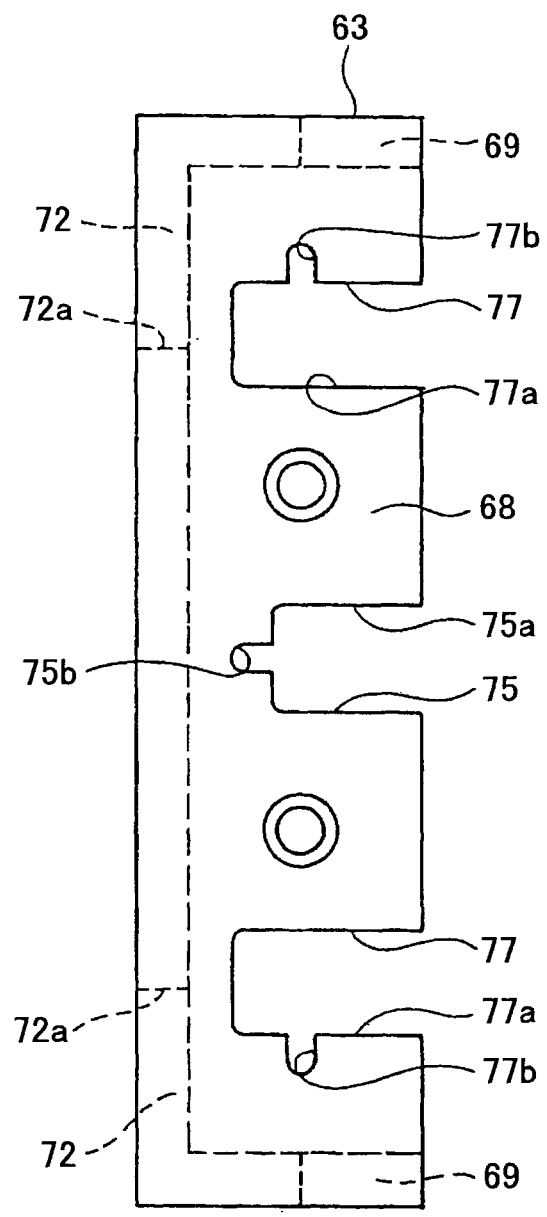
FIG. 12 is plan view illustrating a modification of the intermediate part 63 as shown in FIG. 7.

FIG. 12 is plan view illustrating a modification of the intermediate part 63 as shown in FIG. 7.

Figure 13:
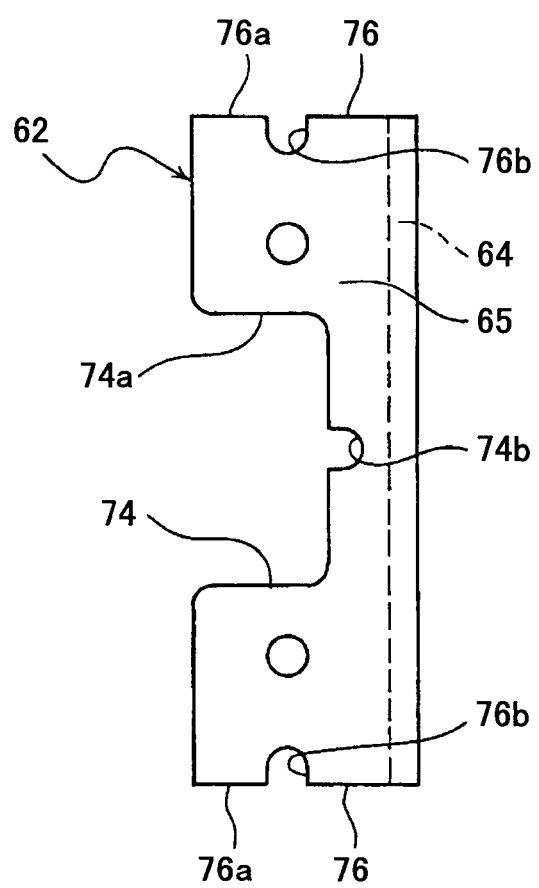
FIG. 13 is plan view illustrating a modification of the bracket 62 as shown in FIG. 8.

FIG. 13 is plan view illustrating a modification of the bracket 62 as shown in FIG. 8.

In the above embodiments, the protruding holes 74, 75, 76, 77 are formed, which penetrate the intermediate part 63 and the bracket 62. However, instead of forming the protruding holes, as shown in FIG. 12 and FIG. 13, the protruding portions 74*b*, 75*b*, 76*b*, 77*b* and spaces allowing the end of the tool, such as the driver 73, to be inserted into the protruding portions 74*b*, 75*b*, 76*b*, 77*b* can be formed.

As shown in FIG. 12 and FIG. 13, portions of the protruding holes 74, 75, 76, 77 of the bracket 62 and the intermediate part 63 may be cut off to form the main portions 74*a*, 75*a*, 76*a*, 77*a* of the protruding holes 74, 75, 76, 77.

In FIG. 12 and FIG. 13, the same reference numbers are assigned to the same elements as those described previously, and overlapping descriptions are omitted.

Further, the protruding portions 74*b*, 75*b*, 76*b*, 77*b* of the protruding holes 74, 75, 76, 77 may be formed to be oriented in directions opposite to those illustrated in previous drawings.

In the above embodiments, it is described that the bracket 62 is superposed on the intermediate part 63. However, the bracket 62 and the intermediate part 63 may be arranged in reverse, that is, the intermediate part 63 may be superposed on the bracket 62. In this case, the through-hole receiving the screw 66 may be formed in the intermediate part 63, and the screw hole for the screw 66 may be formed in the bracket 62.

In the above embodiments, it is described that the light emitted from the light source 80 transmits through the reference chart sheet 79. However, in the above embodiments, the reflected light may be used to position the photoelectric conversion element 42.

In the above embodiments, it is described that the cradle 47, the intermediate part 63, and the bracket 62 are formed from a metal sheet, but the cradle 47, the intermediate part 63, and the bracket 62 may also be molded products formed from a synthesized resin, such as plastic. However, since the photoelectric conversion element 42 dissipates heat, it is preferable that the cradle 47, the intermediate part 63, and the bracket 62 be formed from the metal sheet.

In the above embodiments, the lens block 33 is described, which includes the lenses 40 corresponding to the first optical component in claims of the present application, and the line-type photoelectric conversion element 42 corresponding to the second optical component in claims of the present application, and the relative position of the lenses 40 and the line-type photoelectric conversion element 42 is adjusted. However, the present invention is not limited to these embodiments. The present invention may be applied to any objects in which the relative position of various optical elements is adjusted, such as a polarization element, a dispersion element, and a light emission element. Further, the present invention is not limited to optical elements.

Further, the first position adjustment mechanism 49, the second position adjustment mechanism 50, and the third position adjustment mechanism 51 may be arranged at various positions, and the notches 71, 72 may also be arranged at various positions. Furthermore, the notches 71, 72 of the first position adjustment mechanism 49 may be used in position adjustment in directions other than the thickness direction Y.

The present invention further includes the following embodiments.

A1. A method of assembling an optical device including a first optical component that has a lens for passing through light reflected from a manuscript;

a second optical component that has a photoelectric conversion unit for forming a reflection image from the reflected light; and a fixture structure, wherein the fixture structure includes a first member attached to the first optical component; a second member fixed to the first member by a screw; a third member fixed to the second member by a screw and attached to the second optical component; a first adjustment unit that is able to adjust a relative position of the first member and the second member in a first direction, and is arranged on a first surface of the first member and a second surface of the second member, said first surface and said second surface being parallel to the first direction; a second adjustment unit that is able to adjust a relative position of the second member and the third member in a second direction intersecting the first direction, and is arranged on a third surface of the second member and a fourth surface of the third member, said third surface and said fourth surface being parallel to the second direction; a first screw-fixing unit that is arranged on the first surface of the first member and the second surface of the second member parallel to the first direction, and fixes the first member and the second member by a screw; a second screw-fixing unit that is arranged on the third surface of the second member and the fourth surface of the third member parallel to the second direction, and fixes the second member and the third member by a screw; and a third screw-fixing unit that fixes the first member and a base member by a screw with a relative position of the first member and the base member changeable in a third direction intersecting both the first direction and the second direction, the first member being disposed on the base member, said method comprising the steps of:

adjusting a relative position between the first member, and fixing the first member and the base member with the third screw-fixing unit;

adjusting a relative position between the first member and the second member, and fixing the first member and the second member with the first screw-fixing unit; and adjusting a relative position between the second member and the third member, and fixing the second member and the third member with the second screw-fixing unit.

A2. A method of assembling an optical device including a first optical component that has a lens for passing through light reflected from a manuscript;

a second optical component that has a photoelectric conversion unit for forming a reflection image from the reflected light; and a fixture structure, wherein the fixture structure includes a first member attached to the first optical component; a second member fixed to the first member by a screw; a third member fixed to the second member by a screw and attached to the second optical component; a first adjustment unit that is able to adjust a relative position of the first member and the second member in a first direction, and is arranged on a first surface of the first member and a second surface of the second member, said first surface and said second surface being parallel to the first direction; a second adjustment unit that is able to adjust a relative position of the second member and the third member in a second direction intersecting the first direction, and is arranged on a third surface of the second member and a fourth surface of the third member, said third surface and said fourth surface being parallel to the second direction; a first screw-fixing unit that is arranged on the first surface of the first member and the second surface of the second member parallel to the first direction, and fixes the first member and the second member by a screw; a second screw-fixing unit that is arranged on the third surface of the second member and the fourth surface of the third member parallel to the second direction, and fixes the second member and the third member by a screw; and a third screw-fixing unit that fixes the first member and a base member by a screw with a relative position of the first member and the base member changeable in a third direction intersecting both the first direction and the second direction, the first member being disposed on the base member, said method comprising the steps of:

tentatively fixing the first screw-fixing unit, the second screw-fixing unit, and the third screw-fixing unit;

adjusting relative positions between the base member, the first member, the second member, and the third member in a predetermined one of the first direction, the second direction, and the third direction;

fixing one of the first screw-fixing unit, the second screw-fixing unit, and the third screw-fixing unit corresponding to the predetermined direction; and adjusting relative positions between the base member, the first member, the second member, and the third member in the other ones of the first direction, the second direction, and the third direction.

A3. A method of assembling an optical device including
a first optical component that has a lens for passing through light reflected from a manuscript;
a second optical component that has a photoelectric conversion unit for forming a reflection image from the reflected light; and
a fixture structure, wherein the fixture structure includes a first member attached to the first optical component; a second member fixed to the first member by a screw; and a third member fixed with the second member by a screw and attached to the second optical component; a first adjustment unit that is able to adjust a relative position of the first member and the second member in a first direction, and is arranged on a first surface of the first member and a second surface of the second member, said first surface and said second surface being parallel to the first direction; a second adjustment unit that is able to adjust a relative position of the second member and the third member in a second direction intersecting the first direction, and is arranged on a third surface of the second member and a fourth surface of the third member, said third surface and said fourth surface being parallel to the second direction; a first screw-fixing unit that is arranged on the first surface of the first member and the second surface of the second member parallel to the first direction, and fixes the first member and the second member by a screw; a second screw-fixing unit that is arranged on the third surface of the second member and the fourth surface of the third member parallel to the second direction, and fixes the second member and the third member by a screw; and a third screw-fixing unit that fixes the first member and a base member by a screw with a relative position of the first member and the base member changeable in a third direction intersecting both the first direction and the second direction, the first member being disposed on the base member;
said method comprising the steps of:
fixing or tentatively fixing the base member, the first member, the second member, and the third member; and
when adjusting relative positions between the base member, the first member, the second member, and the third member, adjusting the relative positions between the first member, the second member, and the third member in ascending order of distances of the first member, the second member, and the third member to the base member.

A4. An image reading device able to read an image on a manuscript from light reflected from the manuscript by a photoelectric conversion unit, comprising:
an optical device that includes
a first optical component that includes a lens for passing through light reflected from a manuscript;
a second optical component that includes the photoelectric conversion unit for forming a reflection image from the reflected light; and
a fixture structure;
wherein
the fixture structure includes
a first member attached to the first optical component;
a second member fixed with the first member by a screw;
a third member fixed to the second member by a screw and attached to the second optical component;
a first adjustment unit that is able to adjust a relative position of the first member and the second member in a first direction, and is arranged on a first surface of the first member and a second surface of the second member, said first surface and said second surface being parallel to the first direction; and
a second adjustment unit that is able to adjust a relative position of the second member and the third member in a second direction intersecting the first direction, and is arranged on a third surface of the second member and a fourth surface of the third member, said third surface and said fourth surface being parallel to the second direction.

A5. An image forming device, comprising:
an image reading device configured to read an image on a manuscript from light reflected from the manuscript by a photoelectric conversion unit;
wherein the image reading device has an optical device that includes a first optical component that has a lens for passing through light reflected from a manuscript; a second optical component that has the photoelectric conversion unit for forming a reflection image from the reflected light; and
a fixture structure, wherein the fixture structure includes
a first member attached to the first optical component;
a second member fixed to the first member by a screw;
a third member fixed to the second member by a screw and attached to the second optical component;
a first adjustment unit that is able to adjust a relative position of the first member and the second member in a first direction, and is arranged on a first surface of the first member and a second surface of the second member, said first surface and said second surface being parallel to the first direction; and
a second adjustment unit that is able to adjust a relative position of the second member and the third member in a second direction intersecting the first direction, and is arranged on a third surface of the second member and a fourth surface of the third member, said third surface and said fourth surface being parallel to the second direction.

What is claimed is:
1. A fixture structure, comprising:
a plurality of members fixed to each other by screws;
a first adjustment unit that is able to adjust relative positions of two or more of the members in a first direction, and is arranged on surfaces of the two or more members parallel to the first direction, the first adjustment unit including:
first notches at two opposite ends in a width direction, in a first of the members, and
second notches at two opposite ends in a width direction, in a second of the members; and
a second adjustment unit that is able to adjust relative positions of two or more of the members in a second direction intersecting the first direction, and is arranged on surfaces of the two or more members parallel to the second direction, the second adjustment unit including a first protruding hole in the second of the members and a second protruding hole in a third of the members superposed on the first protruding hole.

2. The fixture structure as claimed in claim 1, wherein the plurality of members comprises:
the first member;
the second member fixed to the first member by a screw; and
the third member fixed to the second member by a screw; wherein
the first adjustment unit is arranged on a first surface of the first member and a second surface of the second member, said first surface and said second surface being parallel to the first direction; and
the second adjustment unit is arranged on a third surface of the second member and a fourth surface of the third member, said third surface and said fourth surface being parallel to the second direction.

3. The fixture structure as claimed in claim 2, further comprising:
- a first screw-fixing unit that is arranged on the first surface of the first member and the second surface of the second member parallel to the first direction, and fixes the first member and the second member by a screw;
- a second screw-fixing unit that is arranged on the third surface of the second member and the fourth surface of the third member parallel to the second direction, and fixes the second member and the third member by a screw; and
- a third screw-fixing unit that fixes the first member and a base member by a screw with a relative position of the first member and the base member changeable in a third direction intersecting both the first direction and the second direction, the first member being disposed on the base member.

4. An optical device, comprising:
- a first optical component that includes a lens for passing through light reflected from a manuscript;
- a second optical component that includes a photoelectric conversion unit for forming a reflection image from the reflected light; and
- a fixture structure;
- wherein the fixture structure includes
- a first member attached to the first optical component;
- a second member fixed to the first member by a screw;
- a third member fixed to the second member by a screw and attached to said second optical component;
- a first adjustment unit that is able to adjust a relative position of the first member and the second member in a first direction, and is arranged on a first surface of the first member and a second surface of the second member, said first surface and said second surface being parallel to the first direction, the first adjustment unit including:
  - first notches at two opposite ends in a width direction, in the first member, and
  - second notches at two opposite ends in a width direction, in the second member; and
- a second adjustment unit that is able to adjust a relative position of the second member and the third member in a second direction intersecting the first direction, and is arranged on a third surface of the second member and a fourth surface of the third member, said third surface and said fourth surface being parallel to the second direction, the second adjustment unit including a first protruding hole in the second member and a second protruding hole in the third member superposed on the first protruding hole.

5. The optical device as claimed in claim 4, wherein the fixture structure further comprises:
- a first screw-fixing unit that is arranged on the first surface of the first member and the second surface of the second member parallel to the first direction, and fixes the first member and the second member by a screw;
- a second screw-fixing unit that is arranged on the third surface of the second member and the fourth surface of the third member parallel to the second direction, and fixes the second member and the third member by a screw; and
- a third screw-fixing unit that fixes the first member and a base member by a screw with a relative position of the first member and the base member changeable in a third direction intersecting both the first direction and the second direction, the first member being disposed on the base member.

6. The optical device as claimed in claim 4, wherein the first adjustment unit and the second adjustment unit are located at positions symmetric with respect to an optical axis of the lens.

7. The optical device as claimed in claim 5, wherein
- there are a plurality of the first screw-fixing units, the second screw-fixing units, and the third screw-fixing units, and
- the first screw-fixing units, the second screw-fixing units, and the third screw-fixing units are respectively located at positions symmetric with respect to an optical axis of the lens.

8. The optical device as claimed in claim 5, wherein each of the first screw-fixing unit, the second screw-fixing unit, and the third screw-fixing unit includes:
- a screw part that is screwed into one of the first member, the second member, and the third member; and
- an urging unit that is disposed between a head of the screw part and the one of the first member, the second member, and the third member, and urges the head of the screw part to move away from the one of the first member, the second member, and the third member.

9. A method of assembling an optical device including
- a first optical component that has a lens for passing through light reflected from a manuscript;
- a second optical component that has a photoelectric conversion unit for forming a reflection image from the reflected light; and
- a fixture structure, wherein the fixture structure includes a first member attached to the first optical component; a second member fixed to the first member by a screw; a third member fixed to the second member by a screw and attached to the second optical component; a first adjustment unit that is able to adjust a relative position of the first member and the second member in a first direction, and is arranged on a first surface of the first member and a second surface of the second member, said first surface and said second surface being parallel to the first direction, the first adjustment unit including: first notches at two opposite ends in a width direction, in the first member, and second notches at two opposite ends in a width direction, in the second member; a second adjustment unit that is able to adjust a relative position of the second member and the third member in a second direction intersecting the first direction, and is arranged on a third surface of the second member and a fourth surface of the third member, said third surface and said fourth surface being parallel to the second direction, the second adjustment unit including a first protruding hole in the second member and a second protruding hole in the third member superposed on the first protruding hole; a first screw-fixing unit that is arranged on the first surface of the first member and the second surface of the second member parallel to the first direction, and fixes the first member and the second member by a screw; a second screw-fixing unit that is arranged on the third surface of the second member and the fourth surface of the third member parallel to the second direction, and fixes the second member and the third member by a screw; and a third screw-fixing unit that fixes the first member and a base member by a screw with a relative position of the first member and the base member changeable in a third direction intersecting both the first direction and the second direction, the first member being disposed on the base member;

said method comprising:
fixing the first screw-fixing unit, the second screw-fixing unit, and the third screw-fixing unit;

partially loosening one of the first screw-fixing unit, the second screw-fixing unit and the third screw-fixing unit corresponding to one of the first direction, the second direction, and the third direction in which relative position adjustment is required;

adjusting relative positions in the one of the first direction, the second direction, and the third direction between the base member, the first member, the second member, and the third member;

fixing the adjusted one of the first screw-fixing unit, the second screw-fixing unit, and the third screw-fixing unit after adjusting relative positions in the one of the first direction, the second direction, and the third direction; and adjusting relative positions between the base member, the first member, the second member, and the third member in the other ones of the first direction, the second direction, and the third direction.

* * * * *

UNITED STATES PATENT AND TRADEMARK OFFICE
CERTIFICATE OF CORRECTION

PATENT NO. : 8,416,467 B2
APPLICATION NO. : 11/776159
DATED : April 9, 2013
INVENTOR(S) : Mitsuru Nakajima Page 1 of 1

It is certified that error appears in the above-identified patent and that said Letters Patent is hereby corrected as shown below:

Title Page, Item (56), under Foreign Patent Documents, add

JP 2794892 06/1998.

Signed and Sealed this
Seventeenth Day of September, 2013

Teresa Stanek Rea
*Deputy Director of the United States Patent and Trademark Office*